(12) United States Patent
Konda et al.

(10) Patent No.: US 11,881,938 B2
(45) Date of Patent: Jan. 23, 2024

(54) PROVISIONING OF ENCRYPTED DNS SERVICES

(71) Applicant: McAfee, LLC, San Jose, CA (US)

(72) Inventors: Tirumaleswar Reddy Konda, Bangalore (IN); Shashank Jain, Bangalore (IN); Himanshu Srivastava, Bangalore (IN); Naveen Kumar Reddy Kandadi, Bangalore (IN); Piyush Pramod Joshi, Aurangabad (IN)

(73) Assignee: McAfee, LLC, San Jose, CA (US)

( * ) Notice: Subject to any disclaimer, the term of this patent is extended or adjusted under 35 U.S.C. 154(b) by 0 days.

(21) Appl. No.: 17/894,898

(22) Filed: Aug. 24, 2022

(65) Prior Publication Data
US 2022/0407855 A1    Dec. 22, 2022

Related U.S. Application Data

(63) Continuation of application No. 16/788,046, filed on Feb. 11, 2020, now Pat. No. 11,444,944.

(51) Int. Cl.
*G06F 7/04* (2006.01)
*H04L 9/40* (2022.01)
(Continued)

(52) U.S. Cl.
CPC .......... *H04L 63/0876* (2013.01); *G16Y 30/10* (2020.01); *H04L 61/4511* (2022.05);
(Continued)

(58) Field of Classification Search
CPC ..... H04L 9/006; H04L 9/0825; H04L 9/3263; H04L 63/0876; H04L 61/4511;
(Continued)

(56) References Cited

U.S. PATENT DOCUMENTS

| 8,739,243 B1 * | 5/2014 | Martini | ................ H04L 63/306 |
| | | | 726/1 |
| 9,363,088 B2 * | 6/2016 | Kalan | ................... H04L 63/061 |

(Continued)

OTHER PUBLICATIONS

Diaz-Sanchez, TLS/PKI Challenges and Certificate Pinning Techniques for IoT and M2M Secure Communications, IEEE, May 2, 2019, pp. 3502-3531. (Year: 2019).*

(Continued)

*Primary Examiner* — Philip J Chea
*Assistant Examiner* — Jenise E Jackson
(74) *Attorney, Agent, or Firm* — Patent Capital Group

(57) ABSTRACT

There is disclosed in one example an enrollment over secure transport (EST)-capable gateway device, including: a hardware platform including a processor and a memory; a first network interface to communicatively couple to an external network, including an external DNS server; a second network interface to communicatively couple to a home network; a caching DNS server including a local DNS cache, and logic to provide DNS services to the home network; and an EST proxy to authenticate to a local endpoint on the home network, provision a DNS server certificate on the local endpoint, provision an authentication domain name (ADN) on the local endpoint, and provide encrypted domain name system (DNS) services to the local endpoint.

20 Claims, 15 Drawing Sheets

(51) Int. Cl.
*G16Y 30/10* (2020.01)
*H04L 61/4511* (2022.01)
*H04L 101/663* (2022.01)

(52) U.S. Cl.
CPC ........ *H04L 63/083* (2013.01); *H04L 63/0823* (2013.01); *H04L 63/166* (2013.01); *H04L 2101/663* (2022.05)

(58) Field of Classification Search
CPC . H04L 63/0823; H04L 63/083; H04L 63/166; H04L 2101/663; G06F 21/606
See application file for complete search history.

(56) References Cited

U.S. PATENT DOCUMENTS

| | | | |
|---|---|---|---|
| 2003/0037142 A1* | 2/2003 | Munger | H04L 63/0428 709/225 |
| 2006/0059337 A1* | 3/2006 | Poyhonen | H04L 61/4511 713/165 |
| 2007/0168458 A1* | 7/2007 | Costa-Requena | H04L 63/0272 709/217 |
| 2012/0054497 A1* | 3/2012 | Korhonen | H04L 63/0823 713/179 |
| 2013/0036307 A1* | 2/2013 | Gagliano | H04L 9/321 713/171 |
| 2017/0093802 A1* | 3/2017 | Norum | H04L 63/0428 |
| 2017/0222981 A1* | 8/2017 | Srivastav | H04L 63/0428 |
| 2019/0075009 A1* | 3/2019 | Fantaske | H04W 4/027 |
| 2019/0253410 A1* | 8/2019 | Joyner | H04L 63/0823 |
| 2019/0253411 A1* | 8/2019 | Joyner | H04L 61/4511 |
| 2021/0119991 A1* | 4/2021 | Agrawal | H04L 67/02 |

OTHER PUBLICATIONS

Corellat et al., Identity-Based Protocol Design for Machine-to Machine Secure Channels, IEEE, Oct. 31, 2014, pp. 91-96. (Year: 2014).*

* cited by examiner

PROVISIONING OF ENCRYPTED DNS SERVICES

CROSS REFERENCE TO RELATED APPLICATIONS

This application claims priority to U.S. patent application Ser. No. 16/788,046, titled "Privacy and Security Enabled Domain Name System with Optional Zero-Touch Provisioning," filed on 11 Feb. 2020, which is incorporated herein by reference in its entirety.

FIELD OF THE SPECIFICATION

This application relates in general to computer network security, and more particularly, though not exclusively, to a system and method for providing a privacy and security enabled domain name system (DNS) with optional zero-touch provisioning.

BACKGROUND

It is common for an enterprise gateway, including a family or home gateway, to provide a DNS server.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

FIG. 1b is a block diagram illustrating selected aspects of the ecosystem of FIG. 1a.

SUMMARY

Figure 1A:
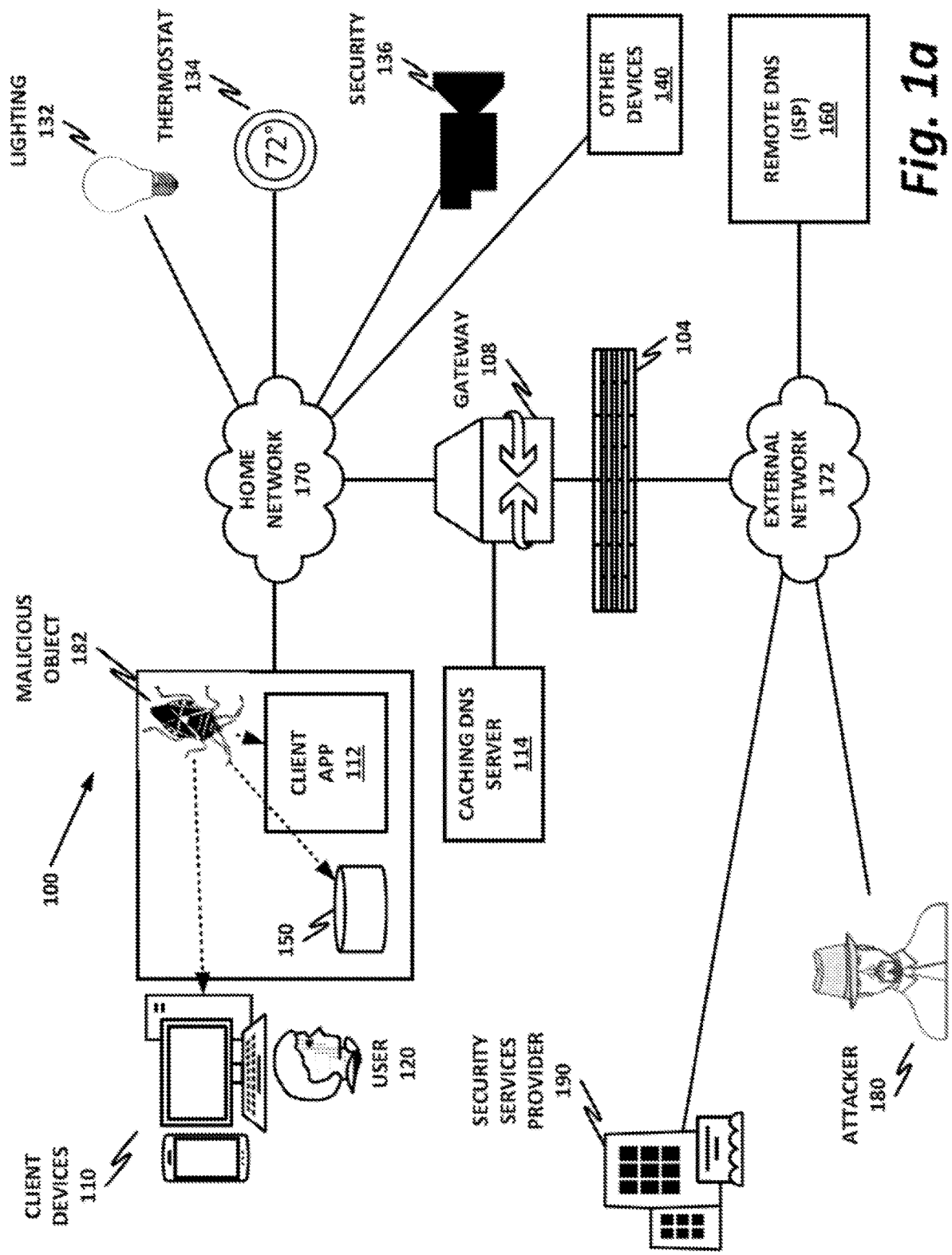
FIG. 1a is a block diagram of selected elements of a security ecosystem.

In an example, there is disclosed an enrollment over secure transport (EST)-capable gateway device, comprising: a hardware platform comprising a processor and a memory; a first network interface to communicatively couple to an external network, including an external DNS server; a second network interface to communicatively couple to a home network; a caching DNS server comprising a local DNS cache, and logic to provide DNS services to the home network; and an EST proxy to authenticate to a local endpoint on the home network, provision a DNS server certificate on the local endpoint, provision an authentication domain name (ADN) on the local endpoint, and provide encrypted domain name system (DNS) services to the local endpoint.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Commonly, enterprises may provide a gateway to act as an access point between the enterprise and the internet, at large. As used in this specification, an enterprise may include a business, government, or other enterprise, and may also include a family or home routing system.

The enterprise gateway provides a caching DNS server that may increase the speed of DNS queries for domain names that have recently been accessed. Commonly, a DNS cache will have a time to live (TTL), after which the DNS query may need to be refreshed. This provides enhanced speed, because internet users commonly access a relatively limited number of domain names over and over again. Because these queries do not need to go out to the outside DNS server, they can be serviced much more quickly. After the TTL expires (e.g., after a timeout period such as 24 hours), the cached DNS entry is purged, and the next query will go out to the original DNS server. However, once again, it is common for users to access the same domain name multiple times. Thus, these queries will hit the DNS cache until the next timeout.

Another benefit of a caching DNS server on the local enterprise gateway is that it can be used to provide privacy, security, and policy enforcement for the enterprise. For example, the use of a caching DNS server limits the ability of the outside DNS server to know how often a particular domain name is accessed by enterprise users. Because the caching DNS server requests the internet protocol (IP) address for the domain name only once per TTL, the outside DNS server does not know how many more times the domain name is accessed during that TTL. The DNS server may employ workarounds to this issue, such as by providing a shortened TTL.

In a network, both internal and external DNS-based attacks can happen. Additionally, pervasive monitoring and modification of DNS messages within an enterprise network is also possible. Thus, the use of privacy and security enabling DNS servers ensures that the DNS communications are secure end-to-end.

This feature can also be used for DNS filtering. For example, a family or a nonfamily enterprise may maintain certain categories of domain names that are blocked, or otherwise restricted. For example, a family may choose to restrict access to pornography, advocacy for illegal or dangerous activity, or other content that is contrary to the family's values. A business or government enterprise may choose to categorize domain names into multiple categories. For example, domain names that are directly related to the enterprise's business operations may be unrestricted. Another category of domain names may include domains that are not restricted, but that are not directly related to the business or government function. These may require, for example, user verification and/or may be subject to special logging. Other domain names may be blocked outright by the enterprise.

Thus, domain name caching and forwarding may be used within an enterprise, including within a family, to provide parental and access controls, block malicious domains, or provide other features.

One difficulty with such DNS caching is newer DNS protocols that use encryption. For example, if an endpoint is configured to use internet hosted or public DNS over TLS (DOT), or DNS over HTTPS (DOH) servers, any available local DNS server cannot service these DNS requests. Thus, the local caching DNS server may be prevented from providing services to local endpoints, and thus may not be able to enforce DNS filtering.

In some cases, browser platforms such as Firefox and operating systems like Android come preconfigured to use internet services hosted via public DOH and DOT servers. These evolving standards can help to address users' privacy concerns and provide security to a certain extent, but they may frustrate the enterprise's ability to provide legitimate controls over the use of its network.

Thus, evolving DNS standards such as DOH and DOT also have major implications on security solutions. For example, MCAFEE, LLC provides Secure Home Platform (SHP), which is a home security service that provides, among other things, DNS forwarding and DNS caching with domain name filtering. However, if DNS traffic is encrypted, SHP and other home or enterprise security systems that are co-located on the home or enterprise browser cannot act on DNS requests from the endpoint and enforce their DNS filtering.

Furthermore, if the endpoint is an internet of things (IoT) device that is configured to use public DOT or DOH services, SHP or similar security platforms cannot enforce, for example, manufacturer usage description (MUD) rules that only allow intended communications to and from the IoT device.

In other words, an enterprise gateway or home security module such as SHP may not be able to enforce the network access control list (ACL) rules based on domain names that it is configured to accept.

It is, therefore, advantageous for an enterprise gateway or other security solution to address the challenges posed by the evolving DNS standards without compromising the security and privacy provided to users by these newer standards. Furthermore, with the increasing attack surfaces of the modern interconnected enterprise, there may be a need to enforce parental control policies on roaming users who visit unsecured networks. For example, parents may be able to enforce access controls, so long as their children's devices are connected to the home network. But when the children are away from home and connected to, for example, a mobile cellular network or a friend's home network, the parents lose control over DNS filtering. This can essentially frustrate the parents' ability to enforce access controls for their children. For example, if the parents provide very strict filtering on their home network, a teenager with a mobile phone may be able to defeat this filtering simply by disconnecting from Wi-Fi and connecting to the mobile cellular network, over which the parents may have relatively less control. Furthermore, if the child has a cell phone that provides mobile tethering, then the child may similarly be able to work around access controls for their other devices, such as laptop computers or tablets, simply by connecting those devices to the tethering feature on the cell phone.

It is beneficial for security vendors to provide seamless security solutions to end users so that access controls are managed and enforced from a single point, rather than (for example) a parent having to separately configure access controls on the home network and on the cellular network. One approach is to provide security offerings including a more holistic, cloud-based solution. Internet service providers (ISPs) and telecommunications provider domains are increasingly turning to deploying network function virtualization (NFV) technology in their data centers and network nodes for scalable and always-on reliability and flexibility.

NFV deployments may help ISPs to improve customer satisfaction while reducing the expensive loss of paying customers or subscribers, referred to as "churn" in the industry.

Thus, one approach is to provide network security services as virtual network functions (VNFs) in the ISP cloud. This provides unified security and enables always-on protection for end users.

Embodiments of the present specification address this need by effectively providing zero-configuration security for users inside their home networks. Embodiments also provide the same security solution while connected to an untrusted Wi-Fi or cellular network outside the protected home or enterprise network.

This addresses challenges described above by automatically provisioning devices attached to the home network with a network-provided DOH or DOT server, and the credentials to mutually authenticate with the server. To support the roaming scenario (e.g., connection to a cellular network or outside network), a minimal agent may be provided on the endpoint that authenticates itself to the DOH/DOT server using the provisioned credentials. This enables enforcement of DNS-based security and parental control filtering, even when provisioned devices are not connected to the home network. In at least some embodiments, the DOH/DOT server may be hosted on the ISP's cloud, and may be integrated with other security technologies. For example, some embodiments may integrate with SHP and Global Threat Intelligence (GTI) provided by MCAFEE, LLC.

In one embodiment, there is provided a novel mechanism of using a secure bootstrapping protocol known as "enrollment over secure transport" (EST) to bootstrap the endpoints into the trusted (e.g., home or enterprise) environment. This is done with a client identity certificate and a DNS server certificate. The provisioned certificates enable the endpoint to continue using the trusted DOH/DOT capable DNS server during roaming. The minimal agent on the endpoint device derives an ADN for the DNS server from the DNS-ID identifier within the subjectAltName field of the DNS server certificate.

The DNS server certificate may then be associated with the derived ADN and matched with the certificate provided by the server during the TLS handshake. The endpoint may use the provisioned client identity certificate to authenticate itself to the DNS server.

This mechanism provides a lightweight EST proxy deployed on the home or enterprise gateway (middle box, such as SHP). There may also be provisioned a minimal agent on the endpoint. In some embodiments, the minimal agent on the endpoint is responsible for discovering and authenticating the EST proxy. Once authenticated, the agent can receive the secure DNS server's DNS server certificate, and provision it on the client along with the ADN. The agent on the endpoint also sends a client identity certificate enroll request to the EST proxy. The EST proxy then creates a unique identifier for the endpoint, and completes the enrollment process with the hosted privacy enabling DNS server on the ISP's network. Upon receiving the signed identity certificate, the agent provisions it on the endpoint and uses it to authenticate itself to the DNS server over the untrusted network. This helps the privacy enabling DNS server to identify the endpoint and enforce the appropriate DNS privacy and security. Advantageously, because the ISP is assumed to have a publicly accessible address, this security can be provided even when the home user is away or on a different network.

Furthermore, the minimal agent on the endpoint ensures that the client seamlessly connects to the provisioned secure DNS server. This enables DNS filtering and DNS caching, both within and outside of the trusted home or enterprise network. The minimal agent also provides client identity certification on the endpoint. The certificates are provided using a secure communication channel. This provides for the use of a minimal agent on the endpoint to detect a connection to an untrusted network and to automatically initiate DOH/DOT connection to the provisioned privacy enabling DNS server, thereby ensuring equivalent privacy and security to the home or enterprise network on any other network.

This provides advantages with respect to existing solutions that may require the establishment of a virtual private network (VPN) connection. VPN connections may require manual configuration (for example, keying in a username and password), as well as creating a bottleneck on the respective VPN server. Additionally, because DNS queries are secured by DOH/DOT, the VPN server still cannot see the DNS traffic, and thus cannot provide DNS-based security and parental control functionality.

The system and method described in this specification provide a zero-touch provisioning for endpoints solution. This provides a seamless experience for the users. It also presents an opportunity for a subscription-based model. In a roaming scenario, in the absence of a VPN service, DNS queries originating from the endpoint are secured using DOH or DOT. DNS-based security and parental control policies can thus be enforced. If the ISP provides a VPN service that is used, the user receives the additional data privacy along with the DNS-based protection, as stated above.

Notably, DNS standards such as DOH and DOT pose challenges for middle boxes enforcing local policies and DNS-based filtering. It is desirable to provide users with a unified view of security, both inside the home or enterprise, and while roaming. Thus, at least two issues are addressed by this specification. The first is providing the user a zero-configuration security solution. The second is extending the security blanket outside the home or enterprise network.

The system and method described herein automatically provisions the endpoint in the trusted home network with the network-provided privacy enabling DOH/DOT server, as well as a client identity to authenticate outside of the home network. Once the provisioning on the endpoint is complete, the minimal agent sitting on the endpoint can automatically detect when the user connects to an untrusted network. The minimal agent then initiates authentication and connection to the provisioned privacy enabling DOH/DOT servers. This solution ensures that the DNS queries originating from the endpoint are secure from any attacker listening in on the untrusted network. This solution also ensures that endpoint specific policies (e.g., parental controls, malware, etc.) can still be enforced, even when the user is away from the home or enterprise network. Furthermore, the configured client credentials can also be used by the client to authenticate with the VPN server and ensure complete data privacy.

In an embodiment, endpoints are provisioned with a DNS server certificate and an identity certificate within the home or enterprise trusted network. This provisioning may include the following entities:
1. An endpoint running an EST client.
2. A home router or consumer premises equipment (CPE) running an EST proxy.
3. An ISP network running an EST server.
4. An ISP network running a DOH/DOT capable DNS server.
5. A minimal agent on the endpoint for detecting roaming scenarios and enforcing use of the provisioned secure DNS server.

A system and method for providing a privacy and security enabled domain name system (DNS) with optional zero-touch provisioning will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1a is a block diagram of a security ecosystem 100. In at least some embodiments, security ecosystem 100 may be configured or adapted to provide privacy and security enabled DNS caching, according to the teachings of the present specification.

In the example of FIG. 1a, security ecosystem 100 may be an enterprise, a government entity, a data center, a telecommunications provider, a "smart home" with computers, smart phones, and various IoT devices, or any other suitable ecosystem. Security ecosystem 100 is provided herein as an illustrative and nonlimiting example of a system that may employ, and benefit from, the teachings of the present specification.

Within security ecosystem 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via home network 170. Home network 170 may be any suitable network or combination of one or more networks operating on one or more suitable networking protocols, including a local area network, an intranet, a virtual network, a wide area network, a wireless network, a cellular network, or the internet (optionally accessed via a proxy, virtual machine, or other similar security mechanism) by way of nonlimiting example. Home network 170 may also include one or more servers, firewalls, routers, switches, security appliances, antivirus servers, or other network devices, which may be single-purpose appliances, virtual machines, containers, or functions. Some functions may be provided on client devices 110.

The term "home network" should be understood to refer to the function of the network as a trusted or home-based network. It does not necessarily mean that it is a network for an individual family. Broadly, home network 170 may refer to any network, including an enterprise network, that user 120 regularly connects to, and in particular, a network having a gateway 108 that includes a caching DNS server 114 configured to provide the privacy enabled DNS services described in this specification.

In this illustration, home network 170 is shown as a single network for simplicity, but in some embodiments, home network 170 may include any number of networks, such as one or more intranets connected to the internet. Home network 170 may also provide access to an external network, such as the internet, via external network 172. External network 172 may similarly be any suitable type of network.

Home network 170 may connect to the internet via gateway 108, which may be responsible, among other things, for providing a logical boundary between home network 170 and external network 172. Home network 170 may also provide services such as dynamic host configuration protocol (DHCP), gateway services, router services, and switching services, and may act as a security portal across local boundary 104.

In some embodiments, gateway 108 may be a standalone internet appliance. Such embodiments are popular in cases in which ecosystem 100 includes a home or small business. In other cases, gateway 108 may run as a virtual machine or in another virtualized manner. In larger enterprises that features service function chaining (SFC) or NFV, gateway 108 may be include one or more service functions and/or virtualized network functions.

Home network 170 may also include a number of discrete IoT devices. For example, home network 170 may include IoT functionality to control lighting 132, thermostats or other environmental controls 134, a security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Remote DNS 160 may be operated, for example, by the ISP that services home network 170 and provides a connection between home network 170 and external network 172. Remote DNS server 160 may provide comprehensive DNS services, such as maintaining a mirror of a master domain name lookup table that is used to resolve domain names to IP addresses. In some cases, remote DNS 160 may provide encrypted or other privacy enabled DNS services, such as DNS over TLS (DTLS) and/or DNS over HTTPS (DOH).

Privacy enabled DNS services may require a trusted and encrypted connection between client device 110 and remote DNS 160. This can cause problems if caching DNS server 114 is to cache DNS requests and resolve cached domain names to provide increased speed and efficiency for home network 170. Furthermore, caching DNS server 114 may also need to provide certain domain name-based services, such as domain name-based filtering, ACLs, parental controls, and other similar DNS services.

In an encrypted communication, caching DNS server 114 is a man in the middle (MITM) between remote DNS 160 and client device 110. Thus, for caching DNS server 114 to provide its intended functionality, either client device 110 must forego privacy enabled DNS services, or caching DNS server 114 must be configured to act as an authorized intermediary between remote DNS 160 and client device 110. The present specification illustrates a number of devices and methods that provide this intermediary functionality, wherein caching DNS server 114 acts as a broker for managing certificates and credentials between client device 110 and remote DNS 160. In general terms, in an unsecured network, remote DNS 160 and client device 110 can be agnostic of the presence of a caching DNS server 114. In those cases, client device 110 simply issues a domain name lookup request, and that request is serviced either by caching DNS server 114 or by remote DNS 160. Client device 110 does not need to know or care which one services the request, or even that there is a two-tiered DNS structure.

On the other hand, in the case of privacy enabled DNS services, caching DNS server 114 is an active participant in establishing the trusted connection between client device 110 and remote DNS 160. Client device 110 still does not need to know which DNS server ultimately resolves its request, but caching DNS server 114 in this case is an explicit part of the trust chain.

Home network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to home network 170, such as security software, security updates, network appliances, or similar. For example, MCAFEE, LLC provides a comprehensive suite of security services that may be used to protect home network 170 and the various devices connected to it.

It may be a goal of users 120 to successfully operate devices on home network 170 without interference from attacker 180. In one example, attacker 180 is a malware author whose goal or purpose is to cause malicious harm or mischief, for example, by injecting malicious object 182 into client device 110. Once malicious object 182 gains access to client device 110, it may try to perform work such as social engineering of user 120, a hardware-based attack on client device 110, modifying storage 150 (or volatile memory), modifying client application 112 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against home network 170.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110 or any of the IoT devices described. As used throughout this specification, malicious software ("malware") includes any object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Home network 170 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include a threat intelligence capability such as the GTI database provided by MCAFEE, LLC, or similar competing products. Security services provider 190 may update its threat intelligence database by analyzing new candidate malicious objects as they appear on client networks and characterizing them as malicious or benign.

Other security considerations within security ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

Figure 1B:
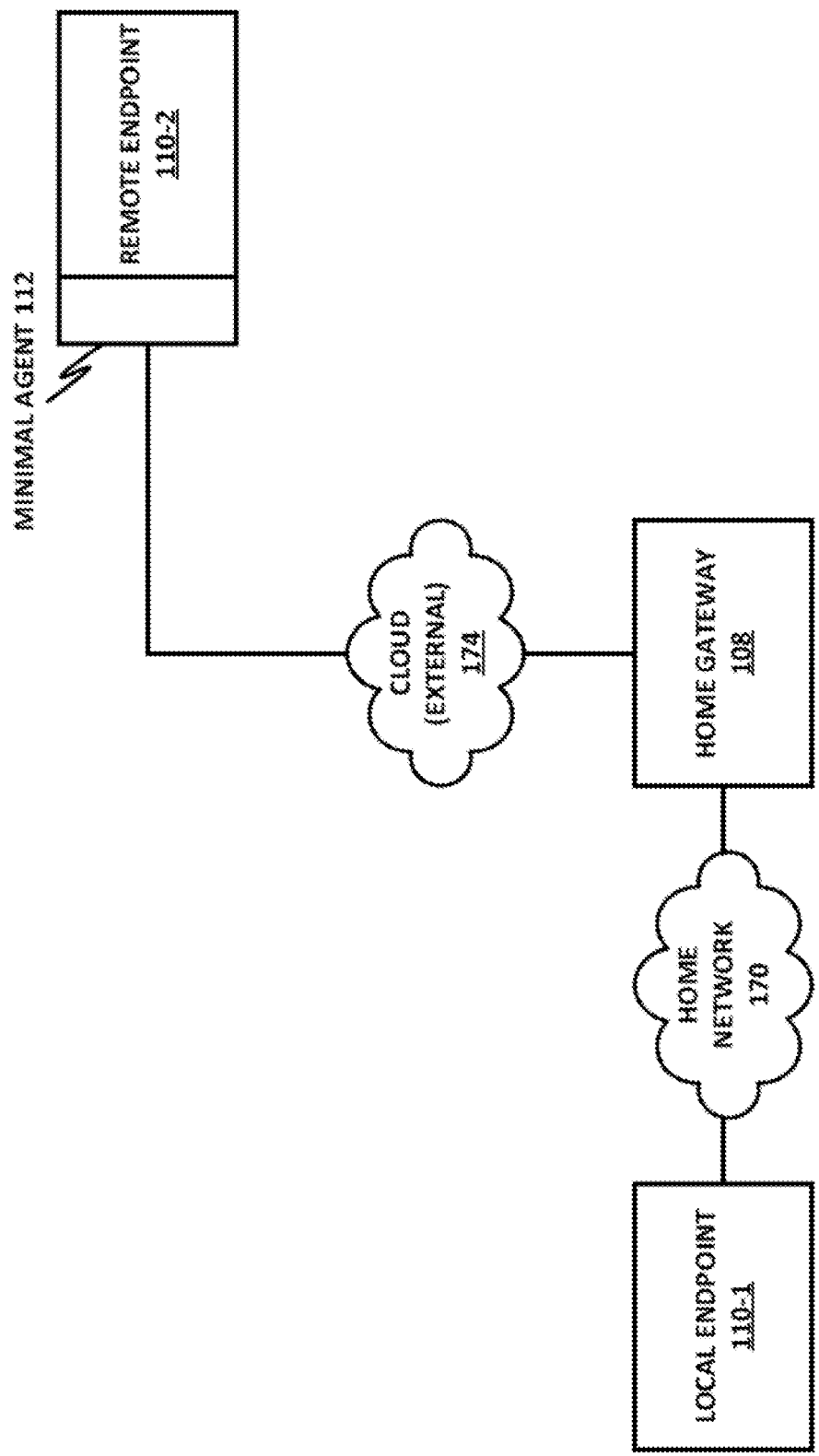

FIG. 1b is a block diagram illustrating selected aspects of the ecosystem of FIG. 1a. In the case of FIG. 1b, the illustration has been simplified to focus on certain elements. Visible in FIG. 1b is local endpoint 110-1, remote endpoint 110-2, home gateway 108, and remote DNS 160.

In this illustration, local endpoint 110-1 connects to home gateway 108 via home network 170. Because home gateway 108 is configured to provide privacy enabled DNS services on home network 170, and because local endpoint 110-1 is a trusted and authenticated device to home gateway 108, home gateway 108 can provide seamless privacy enabled DNS services out to remote DNS 160, without the need for installing an additional agent on local endpoint 110-1.

However, it is a reality of modern computer usage that computing devices do not generally stay in their home network. Users take laptops, tablets, cell phones, and other internet enabled devices to various locations, such as home, work, school, coffee shops, airports, hotels, and many other places. Because these external networks are not part of the trusted home network 170, remote endpoint 110-2 cannot connect directly to home gateway 108. However, it may still be desirable to provide privacy enabled DNS services to remote endpoint 110-2. In that case, remote endpoint 110-2 may include a minimal agent 112. Minimal agent 112 refers simply to the fact that the agent is relatively lightweight, and provides a lightweight DNS proxy for remote endpoint 110-2. Minimal agent 112 is, in some cases, specifically designed to provide minimal interference with the network stack on remote endpoint 110-2, to ensure that the user experience is not affected. In this case, minimal agent 112 connects via cloud 174 to remote DNS 160, and establishes a trust chain independent of home gateway 108. In this case, a caching DNS server on a public network (such as a public Wi-Fi network) that remote endpoint 110-2 connects to may not be able to provide caching DNS services. Because DNS traffic is encrypted, a caching endpoint that is not part of the trust chain is eventually locked out of the communication. In that case, remote endpoint 110-2 communicates directly with remote DNS 160. In some cases, remote endpoint 110-2 may provide its own local DNS cache, for purposes of efficiency.

Furthermore, in at least some embodiments, minimal agent 112 actually connects to home network 170 via cloud 174, and routes DNS requests through home gateway 108. Advantageously, when minimal agent 112 does this, home gateway 108 can still provide services such as ACLs, parental controls, or other controls based on domain names. This can provide peace of mind, for example, to parents who are concerned about their children's internet usage when away from home, or can help employers to ensure that devices are not compromised when connected to public networks.

Figure 2:
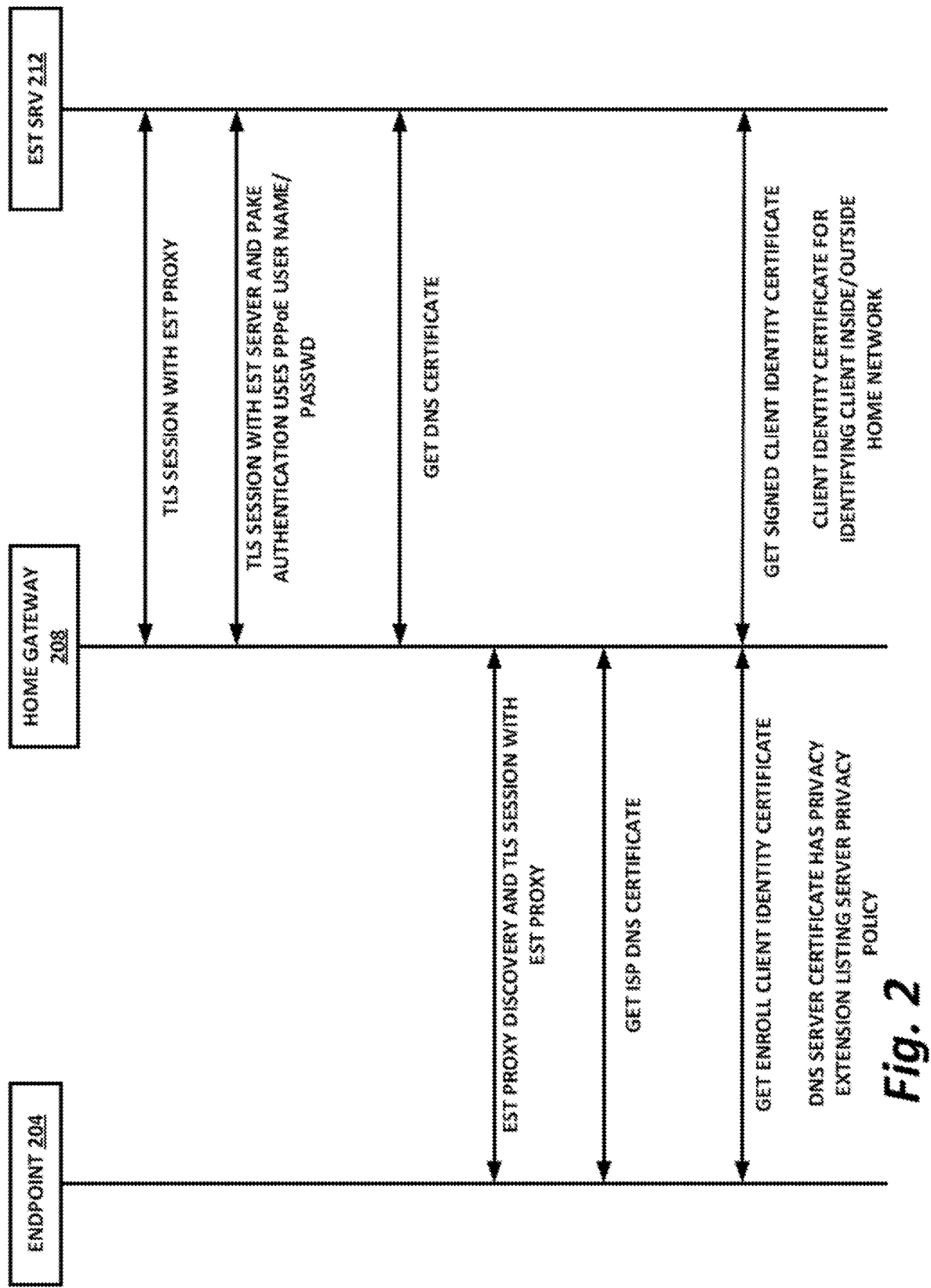
FIG. 2 is a signal flow diagram illustrating establishment of enrollment over secure transport (EST).

FIG. 2 is a signal flow diagram illustrating establishment of enrollment over secure transport (EST). FIG. 2 illustrates communication between a home gateway 208, an endpoint 204, and an EST enabled DNS server (EST server) 212. Endpoint 204 and home gateway 208 may both exist together on a home network. For example, home gateway 208 could be an enterprise gateway, a family home gateway such as SHP by MCAFEE, LLC, or some other home gateway 208.

To provide EST services, home gateway 208 may include an EST proxy. Using the EST proxy, home gateway 208 may first establish a TLS session with EST server 212, via the EST proxy.

By way of illustrative example, after establishing the TLS session with EST server 212, home gateway 208 may use authentication such as a Password-Authenticated Key Agreement (PAKE), or some other similar scheme to authenticate to EST server 212. This may be done, for example, via point-to-point protocol over Ethernet (PPPoE), or via some other protocol.

After home gateway 208 has authenticated to EST server 212, it gets a DNS certificate from EST server 212.

Once home gateway 208 has a valid DNS certificate from EST server 212, an engine on endpoint 204, such as a minimal agent, performs EST proxy discovery and establishes a TLS session with the EST proxy of home gateway 208. After discovering home gateway 208, endpoint 204 gets the ISP's DNS certificate from home gateway 208, which home gateway 208 received from EST server 212.

Endpoint 204 may then issue a GET command to enroll the client identity certificate for endpoint 204. Home gateway 208 gets the signed client identity certificate from EST server 212. In this example, the DNS server certificate has privacy extensions listing the server privacy policy. The client identity certificate is used for identifying the client both inside and outside the home network, thus enabling privacy enabled DNS services both within the home network and when connected as an external endpoint.

Figure 3A:
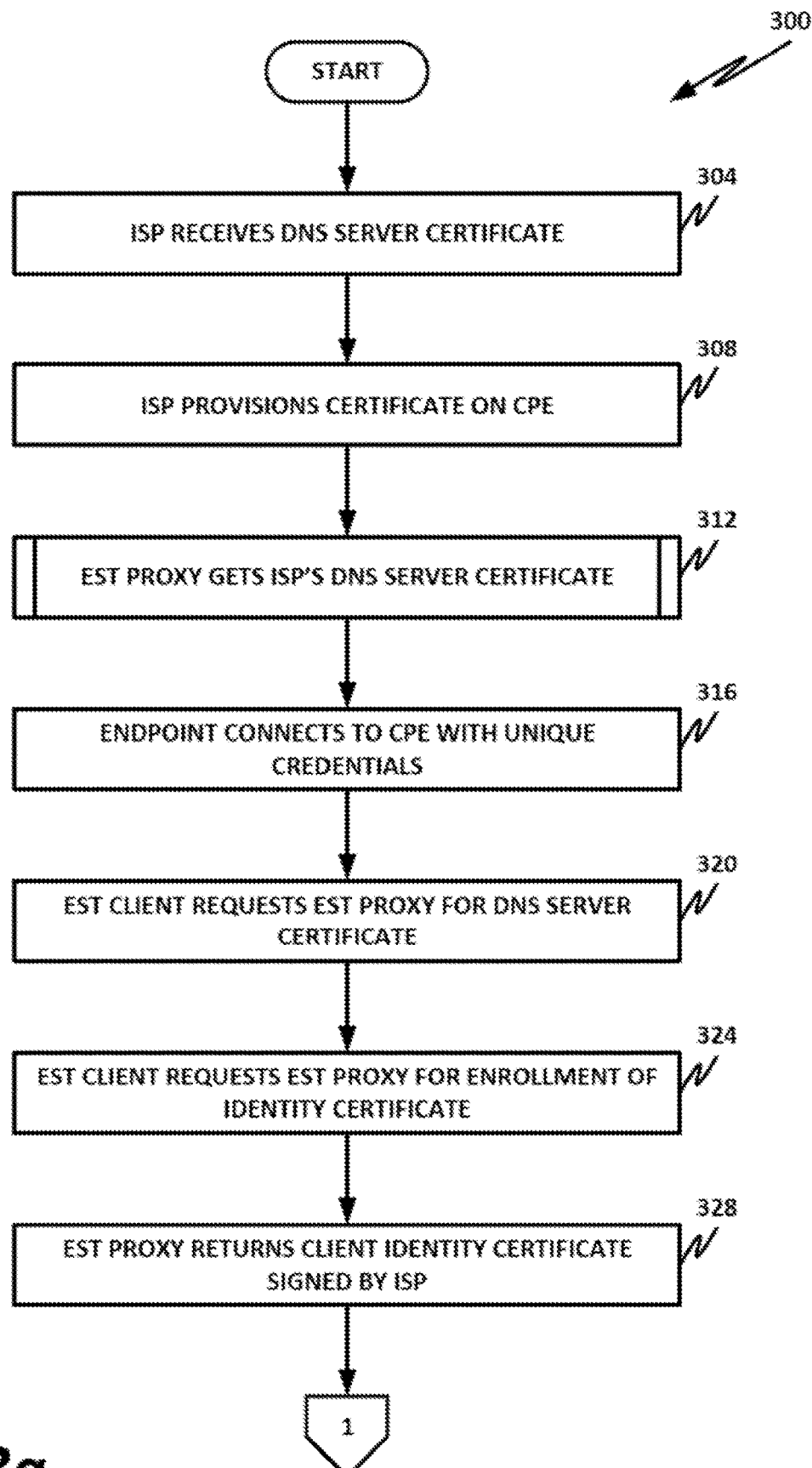
FIGS. 3a-3b are a flowchart of a method that may correspond generally to the signal flow diagram of FIG. 2.
Figure 3B:
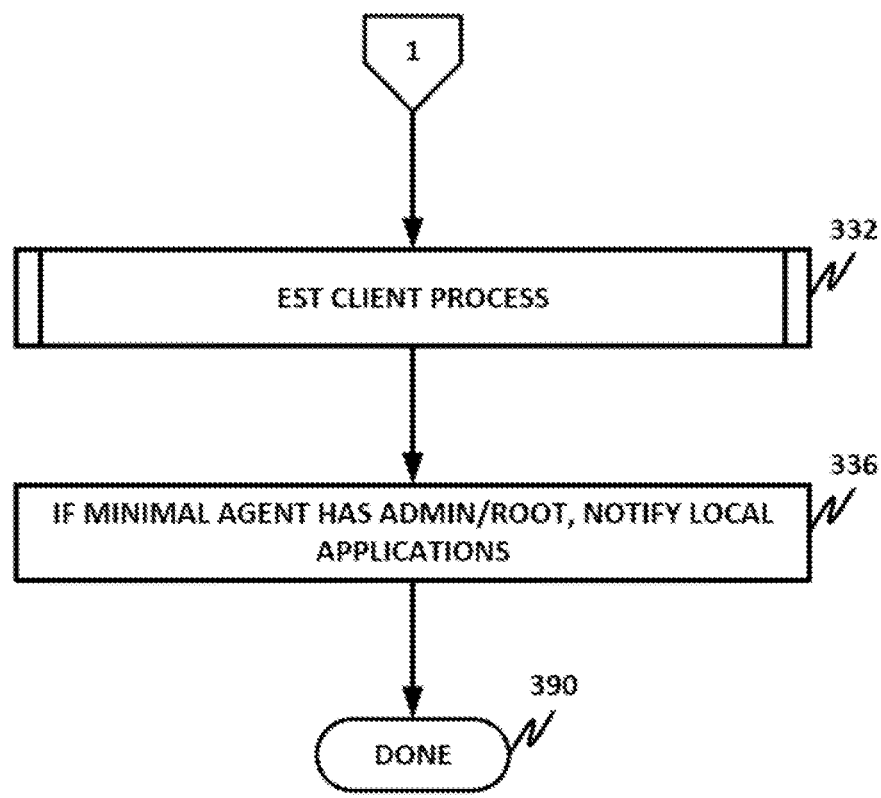

FIGS. 3a-3b are a flowchart of a method 300. Method 300 may correspond generally to the signal flow diagram of FIG. 2, although there may not be exact correlation in every point for every embodiment. However, in understanding method 300 of FIGS. 3a and 3b, it is useful to refer to signal flow diagram of FIG. 2 to understand how data passes between the various components.

In at least one example, method 300 assumes that each endpoint has its own unique set of credentials to connect to the particular CPE, such as a home gateway. The latest Wi-Fi standards, such as Wireless Protected Access 3 (WPA3), include support for this. There are also other ways to configure and assign unique credentials to endpoints.

Starting at block 304, the ISP receives a DNS server certificate signed from a trusted certificate authority (CA). This DNS server certificate may be an end entity certificate that contains a server ID (SRV-ID) identifier type within the subjectAltName entry and the fully qualified domain name (FQDN) of the DOH/DOT capable DNS server. The server ID may be provided in the DNS-ID field of the certificate.

For example, the SRV-ID may be "_domain-s.example-.net" and the DNS-ID may be "example.net."

In block 308, the ISP provisions the DNS server certificate on the CPE (e.g., the home gateway). This may be done at various times, such as during installation, or concurrent with use of an existing CPE provisioning and management protocol like NetConf, TR069, or others. The ability to provision the DNS server certificate on the CPE may depend on whether the ISP provides the CPE, or if it is provided by a third party.

Block 312 is a sub-process that may be followed in the case of an off-the-shelf CPE, such as a third-party home gateway. Sub-process 312 is described in more detail in FIG. 4. Sub-process 312 may be performed by a CPE, such as an off-the-shelf CPE, with an EST proxy sitting on the router. The EST proxy may use the steps of block 312 to get the ISP's server certificate, as necessary.

In block 316, when an endpoint connects to the CPE using its unique username and password, the EST client on the endpoint may establish a TLS connection to the EST proxy and authenticate with it using the same unique credentials that were used to connect to the network.

In block 320, an EST client on the endpoint device requests the EST proxy to get the DNS server certificate from the ISP DNS. The EST proxy responds with the DNS server certificate that it has already received from the ISP DNS. If the EST proxy has not already received a certificate from the ISP DNS, then it may go and fetch the certificate, for example, by following sub-process 312.

In block 324, the EST client requests the EST proxy to provide enrollment of the identity certificate. The EST proxy creates a certificate signing request (CSR) with a unique endpoint identity in the DNS-ID field. The EST proxy then sends the signal GET/enroll to the EST server.

In some examples, the unique endpoint identity can be of this form:
<unique_device_id>-<broad_band_subscriber_id>.Isp_domain_name.com In this example, unique_device_ID is a unique device identifier that is used to map the device with its security and parental control policies. The mapping of the policy to a unique device identifier is provided in some existing home gateways, such as SHP by MCAFEE, LLC. The ISP_domain_name is the domain that the ISP owns, and for which it can sign the certificate. Similarly, in a scenario where a public cloud service provides the DNS instead of the ISP, the public DOH or DOT servers are used as the domain name. In that case, ISP_domain_name will be the domain name of the security service provider.

In block 328, the EST proxy of the CPE/home gateway returns the client identity certificate signed by the ISP to the EST client of the endpoint.

Following off-page connector 1 to FIG. 3b, block 332 represents a subroutine. Subroutine 332 is described in more detail in FIG. 5. Subroutine 332 is a subroutine performed by the EST client on the endpoint device. Subroutine 332 enables the EST client to associate a DNS server certificate with an ADN of a privacy enabled DNS server.

In block 336, if the minimal agent on the endpoint can be configured as an administrative application (e.g., an application with special, administrative, and/or root privileges), the application may use system application program interfaces (APIs). This can include privileged APIs, if provided by the operating system. These APIs may be used to notify the browser and other applications to use the endpoint's native DNS stub resolver instead of their own private DOHs, if available. This ensures that DNS requests go through the CPE/home gateway, which ensures that it can provide access control policies such as parental controls, ACLs, or other policies, based on domain name.

Figure 4:
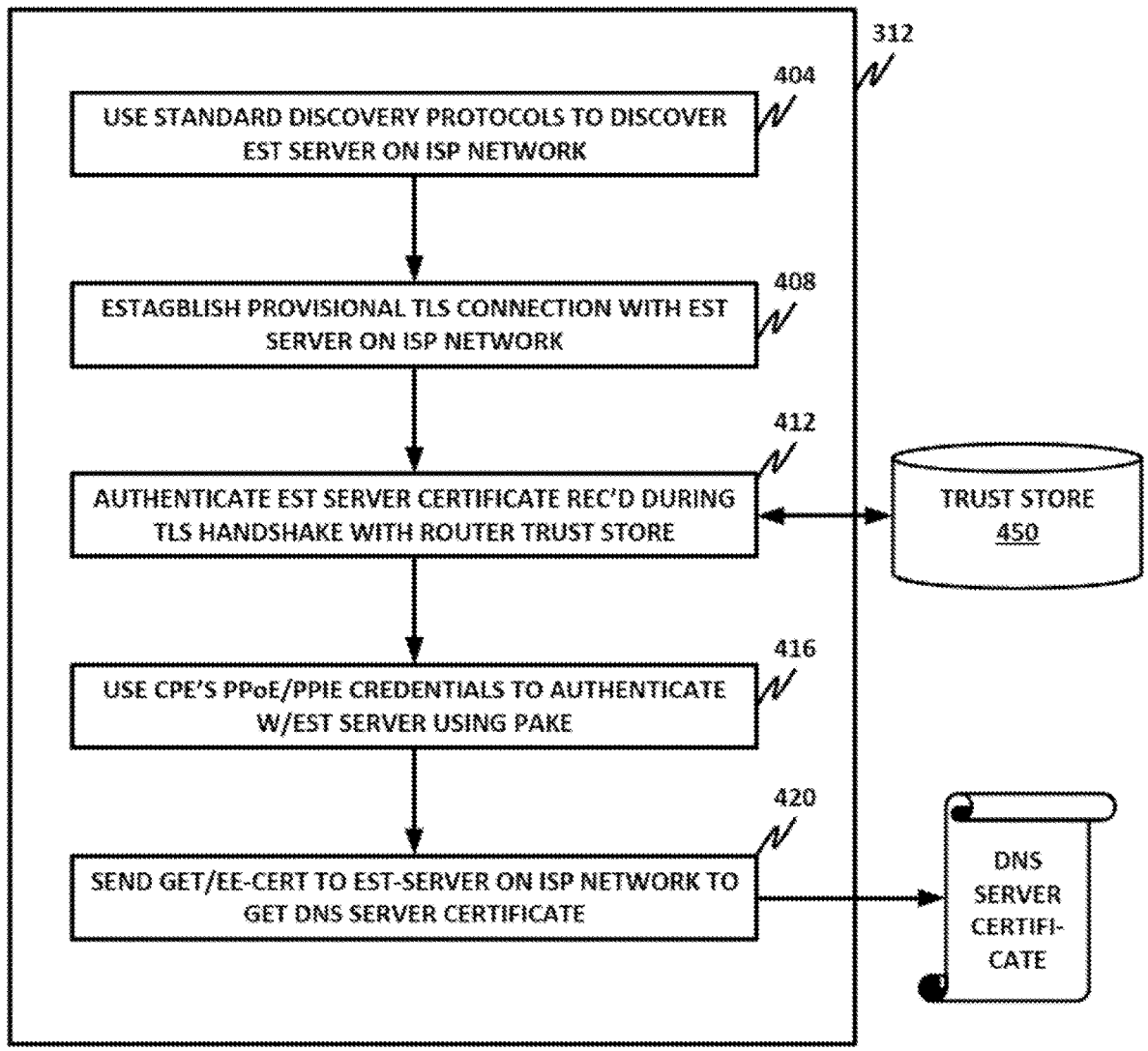
FIG. 4 is a flowchart illustrating a subroutine that may be used by consumer premises equipment (CPE) or a home gateway

FIG. 4 is a flowchart illustrating subroutine 312 of FIG. 3a. Subroutine 312 may be used by CPE, or by a home gateway that is not preconfigured with the DNS server certificate of the ISP.

In block 404, the EST proxy may use standard service discovery protocols, such as DNS server discovery (DNS-SD), multicast DNS (mDNS), or others to discover the EST server on the ISP network.

In block 408, the EST proxy may establish a provisional TLS connection with the EST server on the ISP's network.

In block 412, the EST proxy may authenticate the EST server certificate received during the TLS handshake with trust store 450, available on the CPE.

In block 416, the EST proxy may use the CPE's PPoE/PPIE username and password to authenticate with the EST server using, for example, a Password-Authenticated Key Agreement (PAKE), or similar schemes.

In block 420, the EST proxy sends an instruction such as GET/ee-cert (end entity certificate) to the EST server on the ISP network. This is to get the DNS server certificate.

Figure 5:
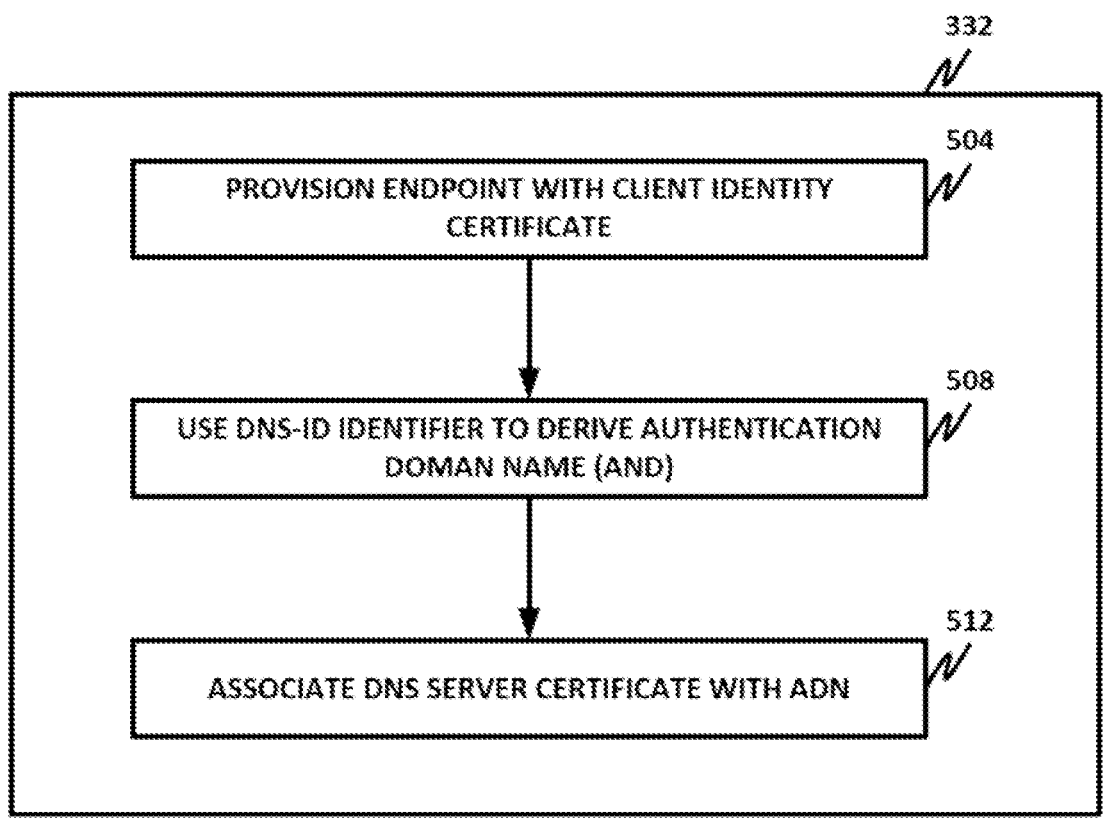
FIG. 5 is a flowchart illustrating a subroutine that may be performed on the EST client.

FIG. 5 is a flowchart illustrating subroutine 332 of FIG. 3b. Subroutine 332 may be performed on the EST client.

In block 504, the EST client provisions the endpoint with the client identity certificate received from the EST proxy of the CPE/home gateway.

In block 508, the EST client uses the DNS-ID identifier in the subjectAltName field of the DNS server certificate to derive an ADN of the privacy enabled DNS server.

In block 512, the EST client of the endpoint associates the DNS server certificate with the ADN. This may later be matched with the certificate provided by the DNS server during the TLS handshake.

Figure 6:
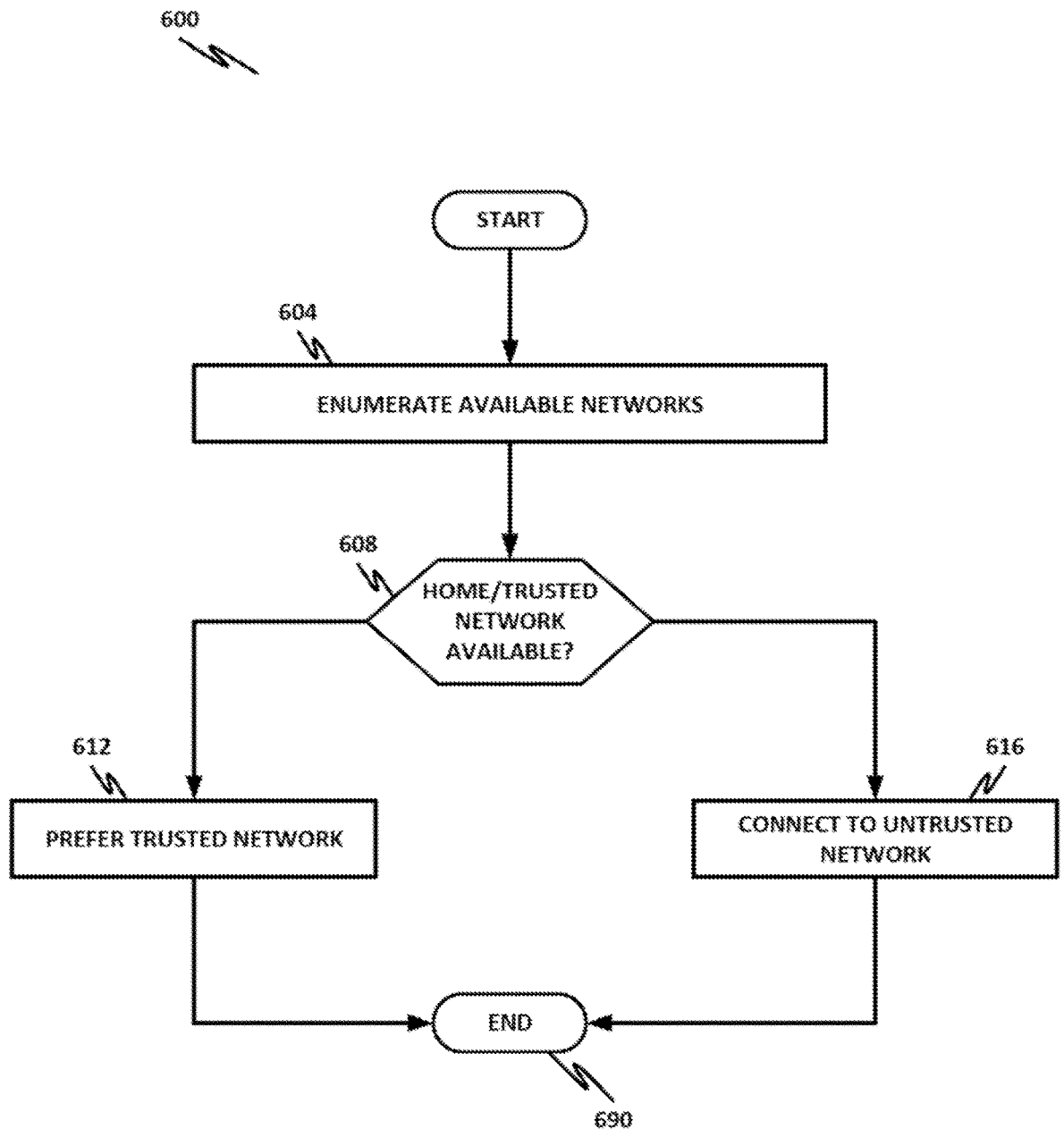
FIG. 6 is a flowchart illustrating a method that may be performed, for example, by a minimal agent on an endpoint.

FIG. 6 is a flowchart illustrating a method 600 that may be performed, for example, by a minimal agent on an endpoint. Method 600 may be particularly useful in the case where the endpoint is acting as a remote endpoint, such as when it is not connected to its home network.

In block 604, the minimal agent on the endpoint may scan for and enumerate any available network connections. This can include an Ethernet network connection, a Wi-Fi network connection, or any other network connection. Depending on the configuration and the location, this may yield one or more available networks.

In decision block 608, the minimal agent determines whether one of the enumerated networks is the home/trusted network.

If the home network was enumerated in the network scan, then in block 612, the minimal agent preferentially establishes a connection to the trusted network.

Returning to decision block 608, if the home network was not enumerated in the listing, then in block 616, the minimal agent may connect to the untrusted network. In some cases, connecting to the untrusted network includes establishing a remote connection to the CPE or home gateway, or establishing a privacy enabled DNS connection to the ISP DNS server.

In block 690, the method is done.

According to method 600 of FIG. 6, once the device is provisioned to identify whether the current Wi-Fi network is the trusted network or some other network, the endpoint will consistently try to first connect with the privacy enabled DNS server without a client identity certificate. If the DNS server rejects the connection, then the current network is treated as untrusted and appropriate action may be taken. If the connection is permitted, the current network is treated as trusted. Note, however, that treating a network as "trusted" does not imply that DNS traffic need not be encrypted or secured. Even within a trusted network, security and privacy enabled DNS services may be provided.

Figure 7:
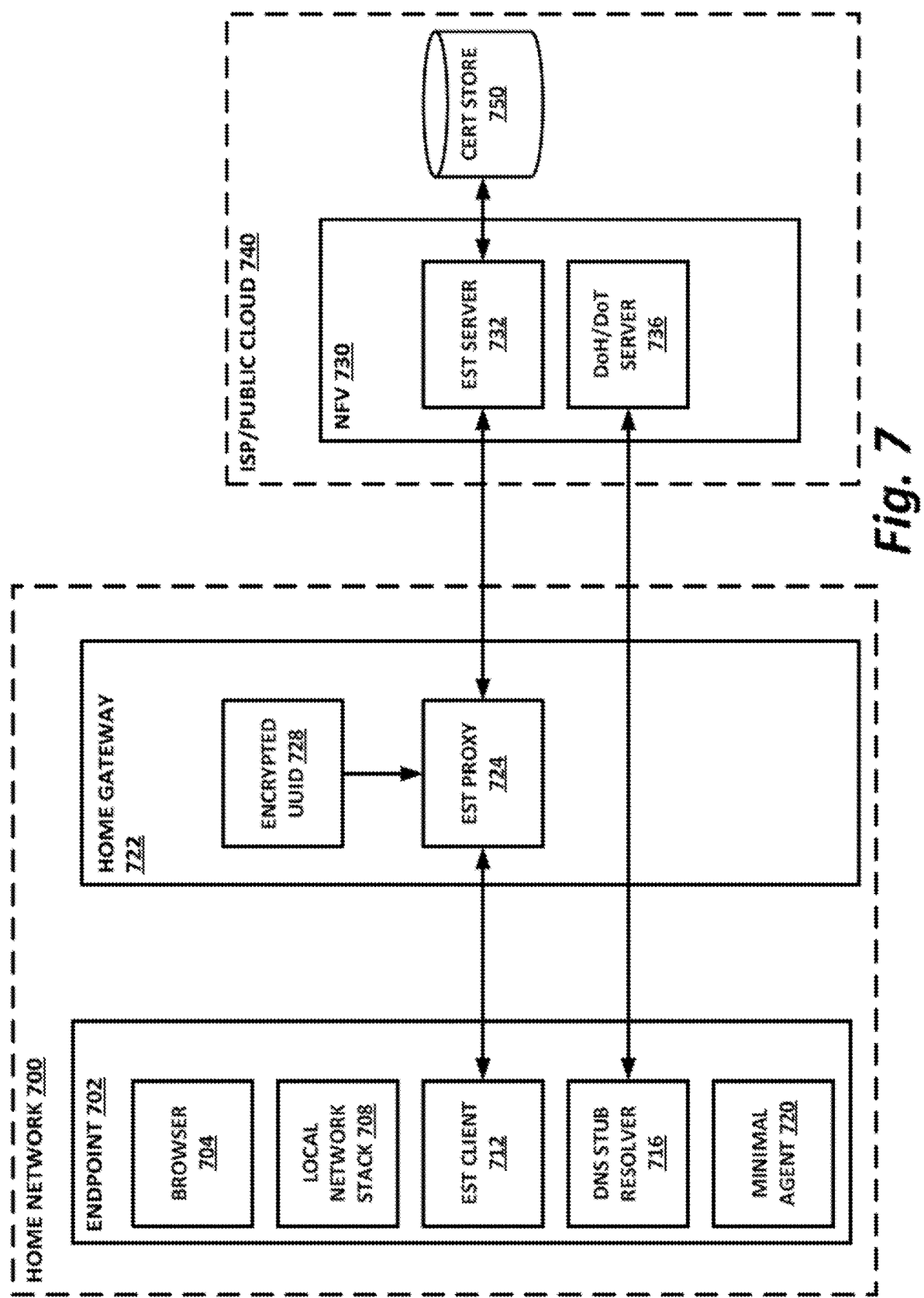
FIG. 7 is a signal flow diagram of a home network connection scenario.

FIG. 7 is a signal flow diagram of a home network connection scenario. In this example, the provisioned device is already configured with the ADN of the privacy enabled DNS server by an EST client as described above, such as in method 300. When the provisioned device is connected inside the home network or some other trusted network, the minimal agent may be inactive and the platform performs DNS over TLS negotiation normally with the privacy enabled DNS server that has already been provisioned.

The server certificate chain may be validated using a trust store and reference identifier validated using the ADN that is already provisioned and associated via the EST client. Once a secure connection is established between the platform and privacy enabled DNS server, the DNS requests may start flowing through.

In this illustration, home network 700 includes a home gateway 722, which may include EST proxy 724, and which may generate one or more encrypted universally unique identifiers (UUID) 728. Home network 700 also includes an endpoint 702, including a browser 704, a local network stack 708, an EST client 712, a DNS stub resolver 716, and a minimal agent 720.

Home network 700 connects to an ISP or public cloud service 740. This could be an ISP with a DNS server, or, for example, a security services vendor that provides secure, encrypted, and/or privacy enabled DNS services. Public cloud 740 includes NFV infrastructure 730, including a VNF having an EST server 732 and a DOH/DOT server 736. EST server 732 is communicatively coupled to a certificate store 750, containing a database of valid certificates.

In this example, EST proxy 724 of home gateway 722 generates encrypted UUID 728 for each endpoint 702 connected to home network 700.

These UUIDs may be kept in sync with the privacy enabled DNS server provided by NFV 730. The method could be, for example, out of band synchronization or detection of new UUIDs in subsequent DNS packets, or some other method.

Home gateway 722 detects a new DNS over TLS session or DNS over HTTPS session between home network 700, endpoints 702, and DNS server 730.

Depending on the source, EST proxy 724 of home gateway 722 may add an encrypted UUID 728 in the TCP option in the session initiation packet.

EST proxy 724 extracts and decrypts the UUID from the TCP option field of each new session packet (SYN packet).

EST proxy 724 then identifies and validates endpoint 722 as the device from which it received a session request. It may do this using the UUID. EST proxy 724 then applies appropriate policies, such as parental controls, IoT device firewalls, or other domain name-based controls to the session.

In this manner, all traffic coming out of home network 700 may be subjected to security and privacy policies, irrespective of whether endpoint 702 has a minimal agent 720 or not.

Figure 8:
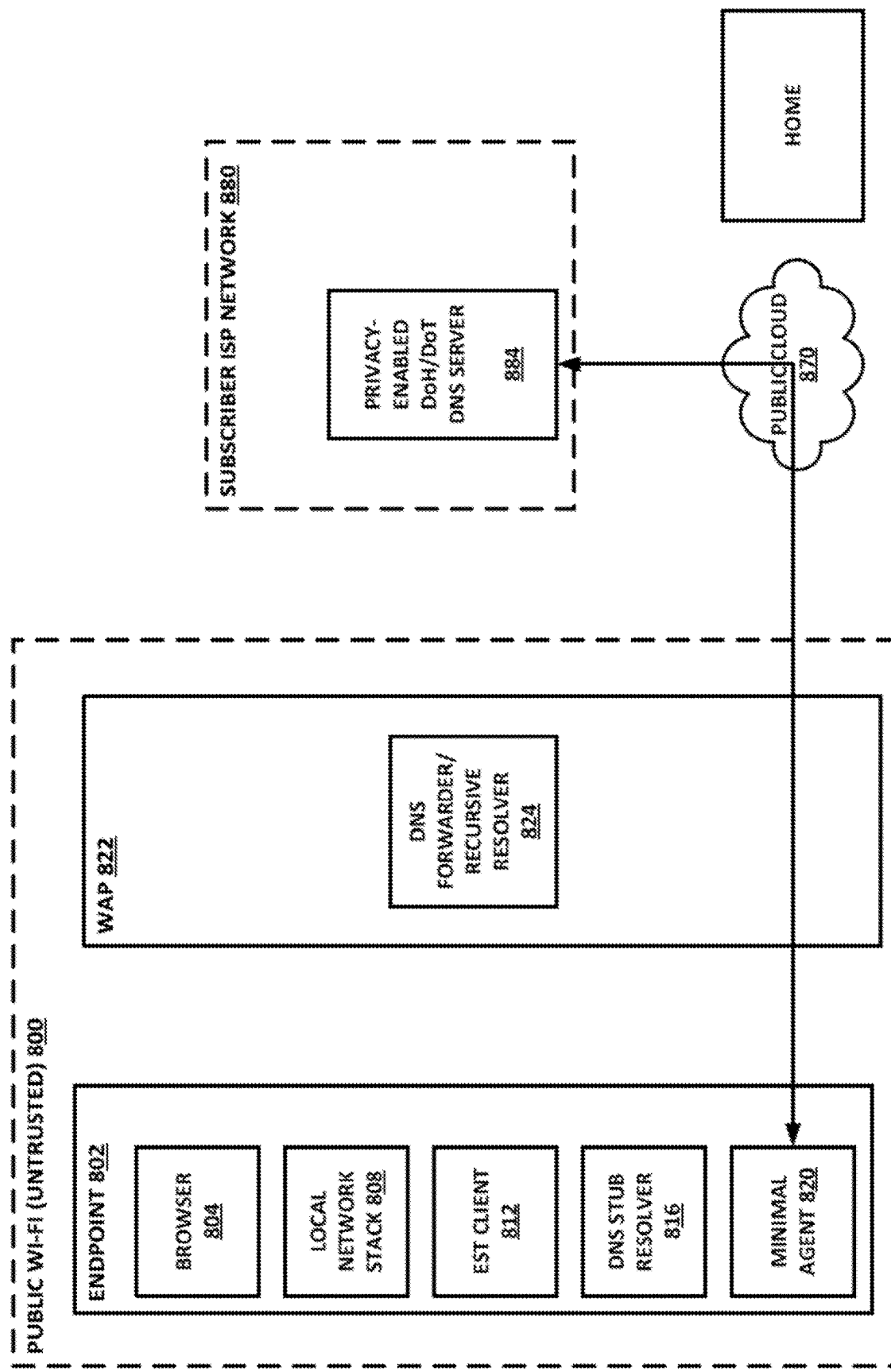
FIG. 8 is a signal flow diagram illustrating a roaming scenario.

FIG. 8 is a signal flow diagram illustrating a roaming scenario. In this example, endpoint 802 is on an untrusted public network such as a Wi-Fi network 800. As before, endpoint 802 includes a browser 804, a local network stack 808, an EST client 812, a DNS stub resolver 816, and a minimal agent 820.

In this case, wireless access point 822 includes a DNS forwarder/recursive resolver 824. Endpoint 802 connects to public cloud 870, which provides access to a subscriber ISP network 880, including a privacy enabled DOH/DOT DNS server 884.

In this illustrative example, endpoint 802 bypasses DNS forwarder/recursive resolver 824 and communicates directly with privacy enabled DOH/DOT DNS server 884.

When endpoint 802 moves out of the home and connects to an untrusted network 800, a roaming scenario is set up. The initial TLS handshake attempt may be terminated by the privacy enabled DNS server, as described above. When minimal agent 820 recognizes that it has connected to an untrusted network, minimal agent 820 on endpoint 802 may take over.

In this case, minimal agent 820 extracts a privacy enabled DNS server FQDN from the DNS-ID field of the provisioned DNS server certificate.

Minimal agent 820 then resolves the FQDN of the privacy enabled DNS server using the roaming network's local DNS.

Minimal agent 820 creates a local DNS proxy, which is a local VPN with a tunnel interface to capture all DNS traffic, such as on port 53.

Minimal agent 820 establishes a DOH connection to the secure DNS server hosted on the ISP network. It validates the DNS server certificate against a chain of trust and uses the provisioned ADN and DNS server certificate to match the certificate received in the TLS handshake. Minimal agent 820 then sends the provisioned identity certificate to the privacy enabled DNS server to prove its identity.

Finally, minimal agent 820 sends all captured DNS queries over DOH to privacy enabled DNS server 884.

In this configuration, the browsers and applications on the endpoint use the native DNS stub resolver 816, which in turn uses the secure DOH tunnel established by minimal agent 820 to secure all DNS queries. Having received and verified the client's identity (identity certificate) as part of the TLS handshake, the security/parental control policies configured corresponding to this endpoint (e.g., as configured in the trusted home network) may now be enforced on privacy enabled DNS server 884. This allows subscriber ISP network 880 to work with the VPN services, and provides additional DNS-based security and parental control capability on top of the privacy that the VPN server provides.

In the roaming scenario, privacy enabled DNS server 884 uniquely identifies endpoint 802 using the identity certificate only, and does not need any additional changes like those used in the home network scenario. The solution presented here is based on the use of a home gateway in the home network, acting as a middle box. However, the solution is not limited to situations in which the consumer has a home segment. The solution could also work equally well with a small to medium size business (SMB) segment. Furthermore, the client certificate provides the identity, and is not limited to proving identity for a privacy enabled DNS server only. The identity certificate could also be extended to access any services in the consumer home or SMB segments.

Note that the description above refers to DOH and DOT servers hosted on the ISP cloud. However, in the absence of such an arrangement (e.g., if there is a delay in ISPs deploying DOH and DOT), a security services vendor can host DOH or DOT servers on a public cloud. The home gateway could then be used as a middle box to provision endpoints. Once provisioned, endpoints can use the identity certificate to authenticate with the security service provider's VPN server and the DOH/DOT server in the roaming Wi-Fi networks. Thus, endpoints can continue to receive home equivalent privacy and protection, whether at home or roaming.

Figure 9:
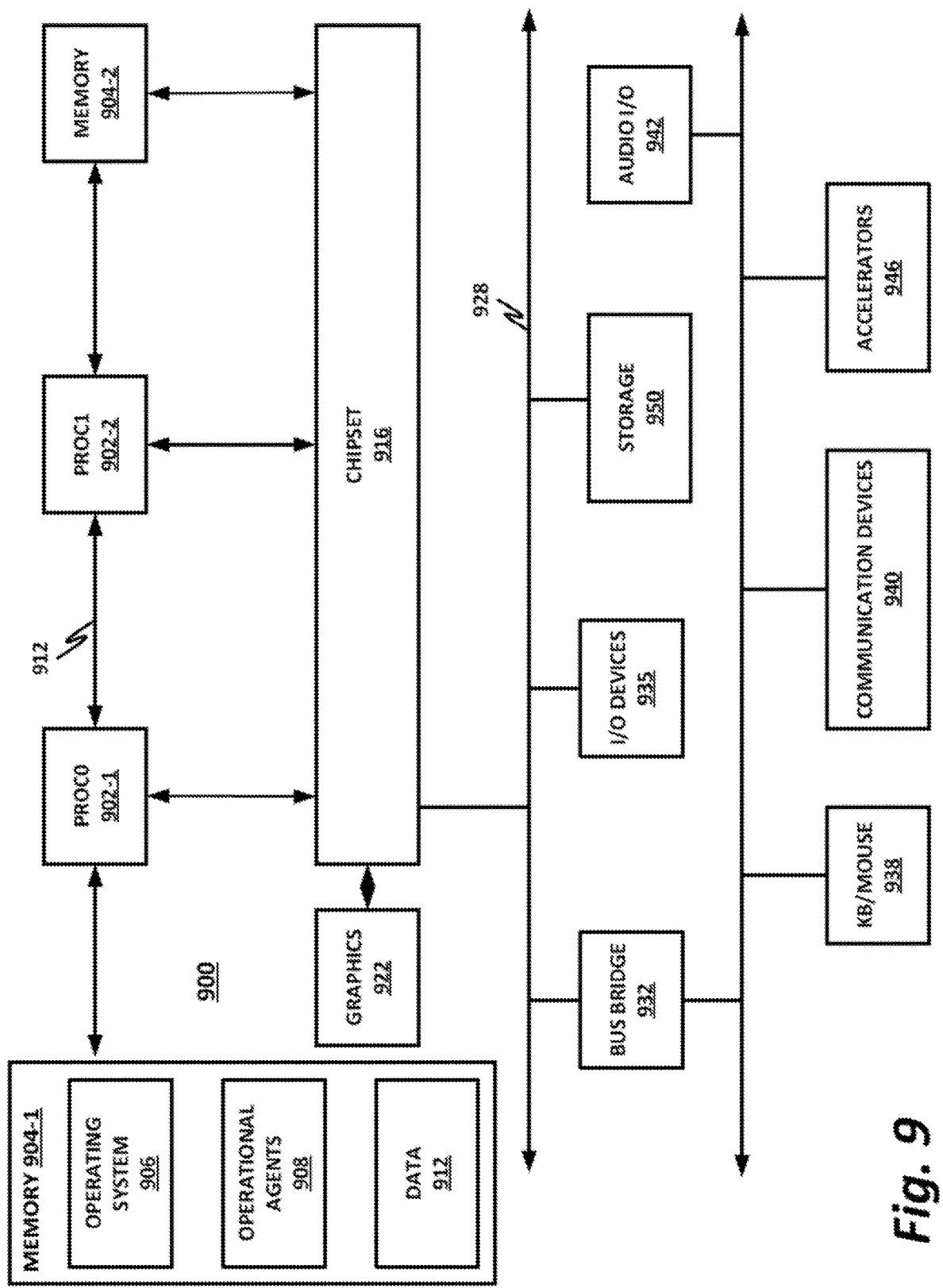
FIG. 9 is a block diagram of selected elements of a hardware platform.

FIG. 9 is a block diagram of a hardware platform 900. In at least some embodiments, hardware platform 900 may be configured or adapted to provide privacy and security enabled DNS caching, according to the teachings of the present specification.

Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 900, even though they may be scattered across a data center, or even located in different data centers.

Hardware platform 900 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 900 is arranged in a point-to-point (PtP) configuration. This PtP configuration is popular for personal computer (PC) and server-type devices, although it is not so limited, and any other bus type may be used.

Hardware platform 900 is an example of a platform that may be used to implement embodiments of the teachings of this specification. For example, instructions could be stored in storage 950. Instructions could also be transmitted to the hardware platform in an ethereal form, such as via a network interface, or retrieved from another source via any suitable interconnect. Once received (from any source), the instructions may be loaded into memory 904, and may then be executed by one or more processor 902 to provide elements such as an operating system 906, operational agents 908, or data 912.

Figure 11:
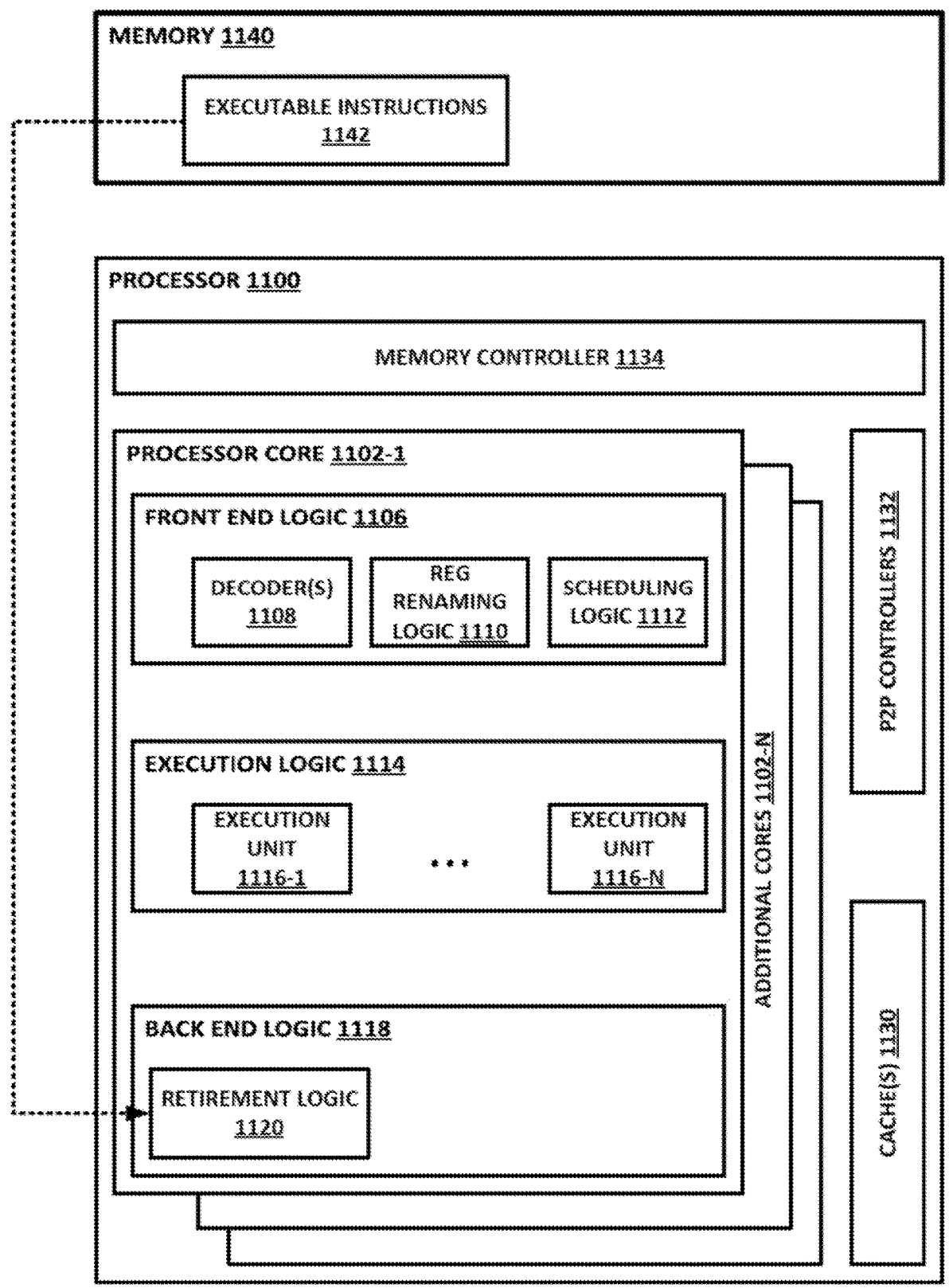
FIG. 11 is a block diagram of selected elements of a processor.

Hardware platform 900 may include several processors 902. For simplicity and clarity, only processors PROC0 902-1 and PROC1 902-2 are shown. Additional processors (such as 2, 4, 8, 16, 24, 32, 64, or 128 processors) may be provided as necessary, while in other embodiments, only one processor may be provided. Details of processors 902 are not illustrated in this FIGURE, but one embodiment is illustrated in FIG. 11. Processors may have any number of cores, such as 1, 2, 4, 8, 16, 24, 32, 64, or 128 cores.

Processors 902 may be any type of processor and may communicatively couple to chipset 916 via, for example, PtP interfaces. Chipset 916 may also exchange data with other elements, such as a high performance graphics adapter 922. In alternative embodiments, any or all of the PtP links illustrated in FIG. 9 could be implemented as any type of bus, or other configuration rather than a PtP link. In various embodiments, chipset 916 may reside on the same die or package as a processor 902 or on one or more different dies or packages. Each chipset may support any suitable number of processors 902. A chipset 916 (which may be a chipset, uncore, Northbridge, Southbridge, or other suitable logic and circuitry) may also include one or more controllers to couple other components to one or more central processor units (CPU).

Two memories, 904-1 and 904-2 are shown, connected to PROC0 902-1 and PROC1 902-2, respectively. As an example, each processor is shown connected to its memory in a direct memory access (DMA) configuration, though other memory architectures are possible, including ones in which memory 904 communicates with processor 910 via a bus. For example, some memories may be connected via a system bus, or in a data center, memory may be accessible in a remote DMA (RDMA) configuration.

Memory 904 may include any form of volatile or nonvolatile memory including, without limitation, magnetic media (e.g., one or more tape drives), optical media, flash, random access memory (RAM), double data rate RAM (DDR RAM) nonvolatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 904 may be used for short, medium, and/or long-term storage. Memory 904 may store any suitable data or information utilized by platform logic. In some embodiments, memory 904 may also comprise storage for instructions that may be executed by the cores of processors 902 or other processing elements (e.g., logic resident on chipsets 916) to provide functionality.

In certain embodiments, memory 904 may comprise a relatively low-latency volatile main memory, while storage 950 may comprise a relatively higher-latency nonvolatile memory. However, memory 904 and storage 950 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 904 and storage 950, for example, in a single physical memory device, and in other cases, memory 904 and/or storage 950 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 922 may be configured to provide a human-readable visual output, such as a command-line interface (CLI) or graphical desktop such as Microsoft Windows, Apple OSX desktop, or a Unix/Linux X Window System-based desktop. Graphics adapter 922 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 922 may include a hardware graphics card, which may have its own memory and its own graphics processing unit (GPU).

Chipset 916 may be in communication with a bus 928 via an interface circuit. Bus 928 may have one or more devices that communicate over it, such as a bus bridge 932, I/O devices 935, accelerators 946, communication devices 940, and a keyboard and/or mouse 938, by way of nonlimiting example. In general terms, the elements of hardware platform 900 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 940 can broadly include any communication not covered by a network interface and the various I/O devices described herein. This may include, for example, various universal serial bus (USB), FireWire, Lightning, or other serial or parallel devices that provide communications.

I/O Devices 935 may be configured to interface with any auxiliary device that connects to hardware platform 900 but that is not necessarily a part of the core architecture of hardware platform 900. A peripheral may be operable to provide extended functionality to hardware platform 900, and may or may not be wholly dependent on hardware platform 900. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 942 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 932 may be in communication with other devices such as a keyboard/mouse 938 (or other input devices such as a touch screen, trackball, etc.), communication devices 940 (such as modems, network interface devices, peripheral interfaces such as PCI or PCIe, or other types of communication devices that may communicate through a network), audio I/O 942, a data storage device 944, and/or accelerators 946. In alternative embodiments, any portions of the bus architectures could be implemented with one or more PtP links.

Operating system 906 may be, for example, Microsoft Windows, Linux, UNIX, Mac OS X, iOS, MS-DOS, or an embedded or real-time operating system (including embedded or real-time flavors of the foregoing). In some embodiments, a hardware platform 900 may function as a host platform for one or more guest systems that invoke application (e.g., operational agents 908).

Operational agents 908 may include one or more computing engines that may include one or more non-transitory computer-readable mediums having stored thereon executable instructions operable to instruct a processor to provide operational functions. At an appropriate time, such as upon booting hardware platform 900 or upon a command from operating system 906 or a user or security administrator, processor 902 may retrieve a copy of the operational agent (or software portions thereof) from storage 950 and load it into memory 904. Processor 910 may then iteratively execute the instructions of operational agents 908 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 900 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel Omni-Path Architecture (OPA), TrueScale, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), VPN, intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 900 may be virtualized, in particular the processor(s) and memory. For example, a virtualized environment may run on OS 906, or OS 906 could be replaced with a hypervisor or virtual machine manager. In this configuration, a virtual machine running on hardware platform 900 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 9 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 10. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Figure 10:
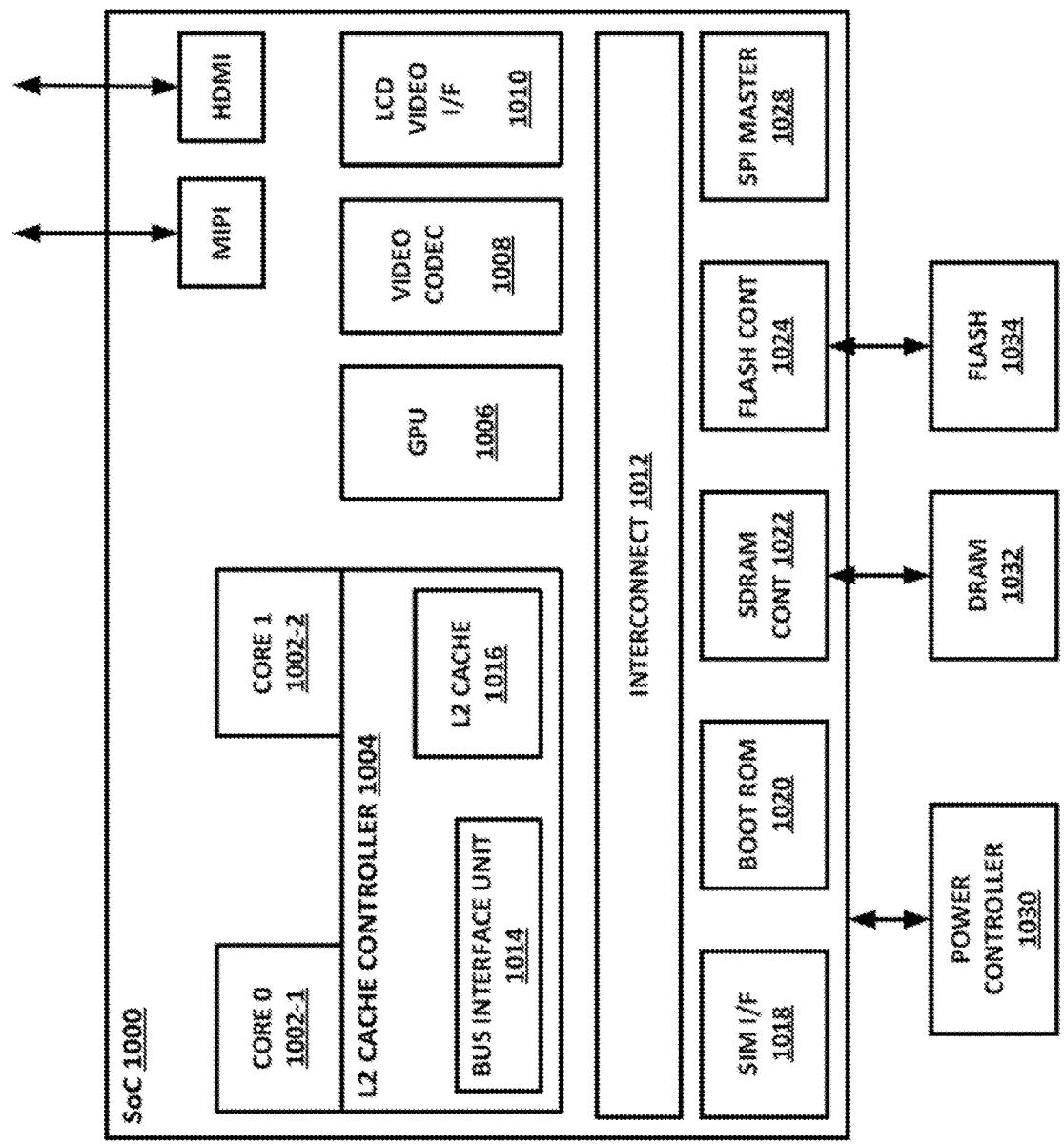
FIG. 10 is a block diagram of selected elements of a system-on-a-chip (SoC).

FIG. 10 is a block illustrating selected elements of an example SoC 1000. In at least some embodiments, SoC 900 may be configured or adapted to provide privacy and security enabled DNS caching, according to the teachings of the present specification.

At least some of the teachings of the present specification may be embodied on an SoC 1000, or may be paired with an SoC 1000. SoC 1000 may include, or may be paired with, an advanced reduced instruction set computer machine (ARM) component. For example, SoC 1000 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 1000 could also be integrated into, for example, a PC, server, video processing components, laptop computer, notebook computer, netbook, or touch-enabled device.

As with hardware platform 900 above, SoC 1000 may include multiple cores 1002-1 and 1002-2. In this illustrative example, SoC 1000 also includes an L2 cache control 1004, a GPU 1006, a video codec 1008, a liquid crystal display (LCD) I/F 1010 and an interconnect 1012. L2 cache control 1004 can include a bus interface unit 1014, a L2 cache 1016. Liquid crystal display (LCD) I/F 1010 may be associated with mobile industry processor interface (MIPI)/HDMI links that couple to an LCD.

SoC 1000 may also include a subscriber identity module (SIM) I/F 1018, a boot ROM 1020, a synchronous dynamic random access memory (SDRAM) controller 1022, a flash controller 1024, a serial peripheral interface (SPI) master 1028, a suitable power control 1030, a dynamic RAM (DRAM) 1032, and flash 1034. In addition, one or more embodiments include one or more communication capabilities, interfaces, and features such as instances of Bluetooth 1036, a 3G modem 1038, a global positioning system (GPS) 1040, and an 802.11 Wi-Fi 1042.

Designers of integrated circuits such as SoC 1000 (or other integrated circuits) may use intellectual property blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a nonvolatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

FIG. 11 is a block diagram illustrating selected elements of a processor 1100. In at least some embodiments, processor 1100 may be configured or adapted to provide privacy and security enabled DNS caching, according to the teachings of the present specification.

In various examples, and throughout this specification and the appended claims, a "processor" may include any combination of logic elements operable to execute instructions, whether loaded from memory, or implemented directly in hardware, including, by way of nonlimiting example, a microprocessor, microcontroller, CPU, advanced RISC (reduced instruction set computing) machine (ARM), digital signal processor (DSP), FPGA, GPU, programmable logic array, ASIC, or virtual machine processor. In certain architectures, a multi-core processor may be provided, having for example, 2, 4, 8, 12, 16, 24, 32, 64, or 128 cores. In some embodiments, one or more co-processors or accelerators (hardware or software) may also be provided for specialized or support functions. In general, processor 1100 may include any number of processing elements, which may be symmetrical or asymmetrical.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

Processor 1100 includes one or more processor cores 1102, including core 1102-1-1102-N. Cores 1102 may be, as appropriate, single-thread cores or multi-thread cores. In multithreaded cores, more than one hardware thread may be provided at a time, and the core may therefore provide more than one logical core per physical core. The cores may be configured to execute instruction code. Each processor 1100 may include at least one shared cache 1130, which may be treated logically as part of memory 1140. Memory 1140 may also contain executable instructions 1142. Caches 1130 may be filled according to known caching techniques, and may store instructions and/or data that may be used by one or more components of processor 1100.

Processor 1100 may include an integrated memory controller (MC) 1134, to communicate with memory 1140. Memory controller 1134 may include logic and circuitry to interface with memory 1140, and may also include a cache controller to handle filling and evicting instructions and data to and from cache 1130.

By way of example, each core 1102 may include front-end logic 1106, execution logic 1114, and backend logic 1118.

In the illustrated embodiment, front-end logic 1106 includes an instruction decoder or decoders 1108, register renaming logic 1110, and scheduling logic 1112. Decoder 1108 may decode instructions received. Register renaming logic 1110 may provide register renaming, for example to facilitate pipelining. Scheduling logic 1112 may schedule instruction execution, and may provide out-of-order (OOO) execution. Front-end logic 1106 may fetch incoming instructions, perform various processing (e.g., caching, decoding, branch predicting, etc.), and pass instructions to execution logic 1114.

Execution logic 1114 includes one or more execution units 1116-1-1116-N. Execution units 1116 may include hardware instructions and microcode to carry out the provided instructions.

Backend logic 1118 includes retirement logic 1120. Core 1102 may provide for speculative execution of instructions, branch prediction, and similar. Retirement logic 1120 may be configured to determine which predicted instructions were actually needed by the program flow.

Processor 1100 may also include a PtP controller 1132, which enables connection to an uncore, chipset, Northbridge, Southbridge, or bus, by way of example.

Figure 12:
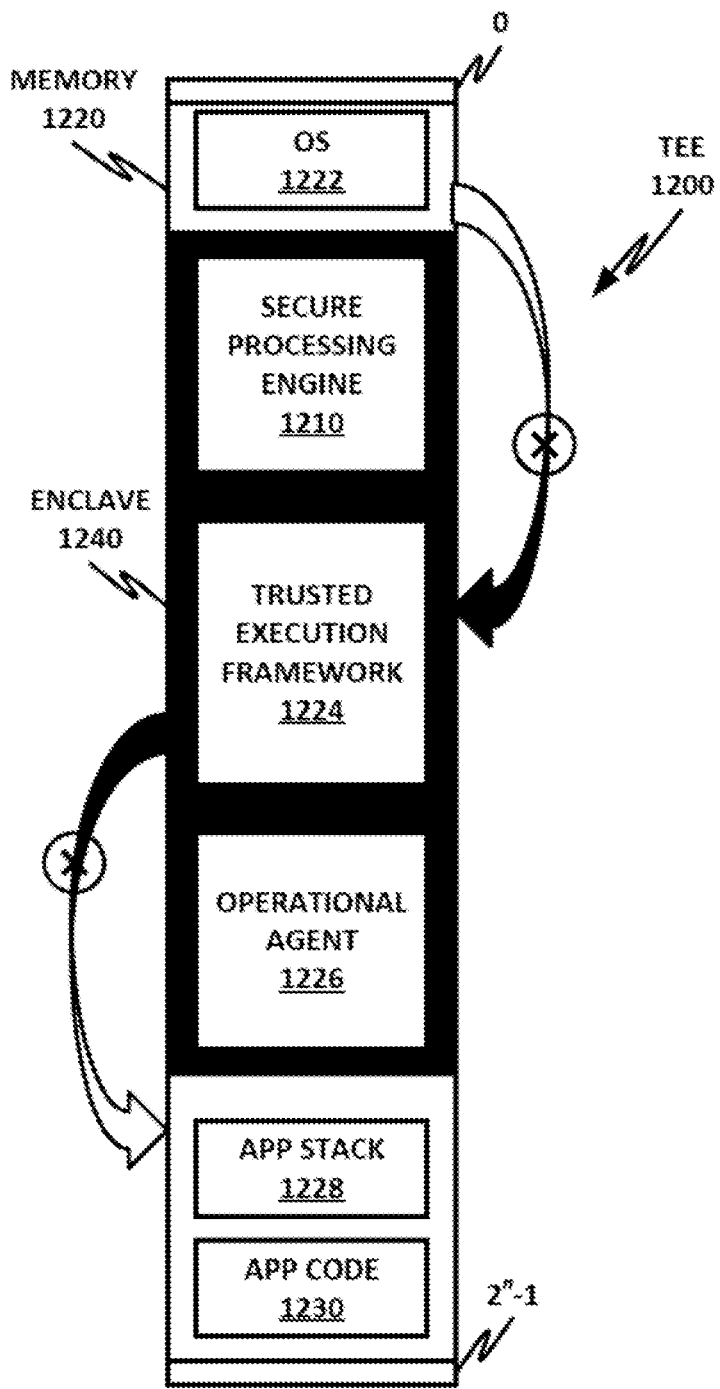
FIG. 12 is a block diagram of selected elements of a trusted execution environment (TEE).

FIG. 12 is a block diagram of a trusted execution environment (TEE) 1200. In at least some embodiments, privacy and security enabled DNS caching according to the teachings of the present specification may be provided within TEE 1200.

In the example of FIG. 12, memory 1220 is addressable by n-bits, ranging in address from 0 to $2^n-1$ (note, however, that in many cases, the size of the address space may far exceed the actual memory available). Within memory 1220 is an OS 1222, an enclave 1240, an application stack 1228, and an application code 1230.

In this example, enclave 1240 is a specially-designated portion of memory 1220 that cannot be entered into or exited from except via special instructions, such as Intel Software Guard Extensions (SGX) or similar. Enclave 1240 is provided as an example of a secure environment which, in conjunction with a secure processing engine 1210, forms a TEE 1200 on a hardware platform such as platform 900 of FIG. 9. A TEE 1200 is a combination of hardware, software, and/or memory allocation that provides the ability to securely execute instructions without interference from outside processes, in a verifiable way. By way of example, TEE 1200 may include memory enclave 1240 or some other protected memory area, and a secure processing engine 1210, which includes hardware, software, and instructions for accessing and operating on enclave 1240. Nonlimiting examples of solutions that either are or that can provide a TEE include Intel SGX, ARM TrustZone, AMD Platform Security Processor, Kinibi, securiTEE, OP-TEE, TLK, T6, Open TEE, SierraTEE, CSE, VT-x, MemCore, Canary Island, Docker, and Smack. Thus, it should be noted that in an example, secure processing engine 1210 may be a user-mode application that operates via trusted execution framework 1224 within enclave 1240. TEE 1200 may also conceptually include processor instructions that secure processing engine 1210 and trusted execution framework 1224 require to operate within enclave 1240.

Secure processing engine 1210 and trusted execution framework 1224 may together form a trusted computing base (TCB), which is a set of programs or computational units that are trusted to be secure. Conceptually, it may be advantageous to keep TCB relatively small so that there are fewer attack vectors for malware objects or for negligent software. Thus, for example, operating system 1222 may be excluded from TCB, in addition to the regular application stack 1228 and application code 1230.

In certain systems, computing devices equipped with Intel SGX or equivalent instructions may be capable of providing an enclave 1240. It should be noted, however, that many other examples of TEEs are available, and TEE 1200 is provided only as one example thereof. Other secure environments may include, by way of nonlimiting example, a virtual machine, sandbox, testbed, test machine, or other similar device or method for providing a TEE 1200.

In an example, enclave 1240 provides a protected memory area that cannot be accessed or manipulated by ordinary computer instructions. Enclave 1240 is described with particular reference to an Intel SGX enclave by way of example, but it is intended that enclave 1240 encompass any secure processing area with suitable properties, regardless of whether it is called an "enclave."

One feature of an enclave is that once an enclave region 1240 of memory 1220 is defined, as illustrated, a program pointer cannot enter or exit enclave 1240 without the use of special enclave instructions or directives, such as those provided by Intel SGX architecture. For example, SGX processors provide the ENCLU[EENTER], ENCLU[ERESUME], and ENCLU[EEXIT]. These are the only instructions that may legitimately enter into or exit from enclave 1240.

Thus, once enclave 1240 is defined in memory 904, a program executing within enclave 1240 may be safely verified to not operate outside of its bounds. This security feature means that secure processing engine 1210 is verifiably local to enclave 1240. Thus, when an untrusted packet provides its content to be rendered with trusted execution framework 1224 of enclave 1240, the result of the rendering is verified as secure.

Enclave 1240 may also digitally sign its output, which provides a verifiable means of ensuring that content has not been tampered with or modified since being rendered by secure processing engine 1210. A digital signature provided by enclave 1240 is unique to enclave 1240 and is unique to the hardware of the device hosting enclave 1240.

Figure 13:
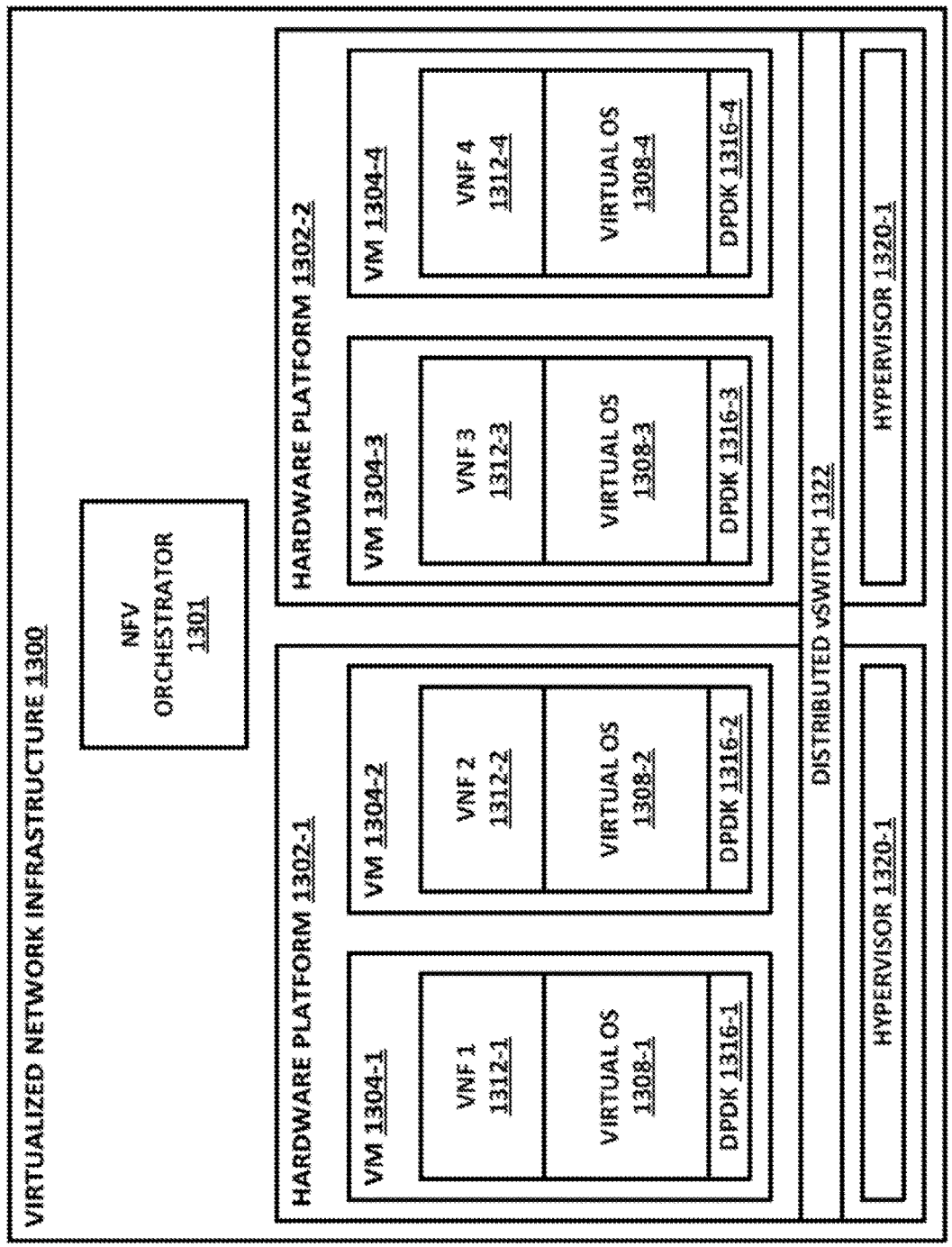
FIG. 13 is a block diagram of selected elements of a network function virtualization (NFV) infrastructure.

FIG. 13 is a block diagram of a network function virtualization (NFV) infrastructure 1300. In at least some embodiments, privacy and security enabled DNS caching according to the teachings of the present specification may be provided within NFV infrastructure 1300.

NFV is an aspect of network virtualization that is generally considered distinct from, but that can still interoperate with, software defined networking (SDN). For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun up") or removed ("spun down") to meet network demands. For example, in times of high load, more load balancing VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 1300. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 13, an NFV orchestrator 1301 manages a number of the VNFs 1312 running on an NFVI 1300. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 1301 a valuable system resource. Note that NFV orchestrator 1301 may provide a browser-based or graphical configuration interface, and in some embodiments may be integrated with SDN orchestration functions.

Note that NFV orchestrator 1301 itself may be virtualized (rather than a special-purpose hardware appliance). NFV orchestrator 1301 may be integrated within an existing SDN system, wherein an operations support system (OSS) manages the SDN. This may interact with cloud resource management systems (e.g., OpenStack) to provide NFV orchestration. An NFVI 1300 may include the hardware, software, and other infrastructure to enable VNFs to run. This may include a hardware platform 1302 on which one or more VMs 1304 may run. For example, hardware platform 1302-1 in this example runs VMs 1304-1 and 1304-2. Hardware platform 1302-2 runs VMs 1304-3 and 1304-4. Each hardware platform may include a hypervisor 1320, virtual machine manager (VMM), or similar function, which may include and run on a native (bare metal) operating system, which may be minimal so as to consume very few resources.

Hardware platforms 1302 may be or comprise a rack or several racks of blade or slot servers (including, e.g., processors, memory, and storage), one or more data centers, other hardware resources distributed across one or more geographic locations, hardware switches, or network interfaces. An NFVI 1300 may also include the software architecture that enables hypervisors to run and be managed by NFV orchestrator 1301.

Running on NFVI 1300 are a number of VMs 1304, each of which in this example is a VNF providing a virtual service appliance. Each VM 1304 in this example includes an instance of the Data Plane Development Kit (DPDK), a virtual operating system 1308, and an application providing the VNF 1312.

Virtualized network functions could include, as nonlimiting and illustrative examples, firewalls, intrusion detection systems, load balancers, routers, session border controllers, DPI services, network address translation (NAT) modules, or call security association.

The illustration of FIG. 13 shows that a number of VNFs 1304 have been provisioned and exist within NFVI 1300. This FIGURE does not necessarily illustrate any relationship between the VNFs and the larger network, or the packet flows that NFVI 1300 may employ.

The illustrated DPDK instances 1316 provide a set of highly-optimized libraries for communicating across a virtual switch (vSwitch) 1322. Like VMs 1304, vSwitch 1322 is provisioned and allocated by a hypervisor 1320. The hypervisor uses a network interface to connect the hardware platform to the data center fabric (e.g., an HFI). This HFI may be shared by all VMs 1304 running on a hardware platform 1302. Thus, a vSwitch may be allocated to switch traffic between VMs 1304. The vSwitch may be a pure software vSwitch (e.g., a shared memory vSwitch), which may be optimized so that data are not moved between memory locations, but rather, the data may stay in one place, and pointers may be passed between VMs 1304 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 1322 is illustrated, wherein vSwitch 1322 is shared between two or more physical hardware platforms 1302.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may results in substitute arrangements, design choices, device possibilities, hardware configurations, software implementations, and equipment options.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the invention, as claimed, and the exclusion of certain elements from the FIGURES is not intended to imply that the element is to be excluded from the invention as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

EXAMPLE IMPLEMENTATIONS

There is disclosed in example 1, a method of provisioning an endpoint device for encrypted domain name service (DNS) resolution, comprising: provisioning a signed client identity certificate for the endpoint device, comprising providing, from an intermediate device, an unsigned client identity certificate for the endpoint device to an enrollment server, receiving from the enrollment server the signed client identity certificate, and providing the signed client identity certificate to the endpoint device; receiving a server certificate for a DNS server; providing the server certificate to the endpoint device; and establishing an encrypted DNS session between the endpoint device and the DNS server using the signed client identity certificate and the server certificate.

There is further disclosed in example 2, the method of example 1, further comprising establishing a transport layer security (TLS) session between the intermediate device and the endpoint device, and providing the server certificate via the TLS session.

There is further disclosed in example 3, the method of example 1, wherein the intermediate device is a home network gateway.

There is further disclosed in example 4, the method of example 3, further comprising providing caching DNS services via the home network gateway.

There is further disclosed in example 5, the method of example 3, further comprising maintaining a copy of the signed client identity certificate on the home network gateway, whereby the home network gateway can act as an intermediary in the encrypted DNS session.

There is further disclosed in example 6, the method of example 1, further comprising providing domain-name based access controls for the encrypted DNS session.

There is further disclosed in example 7, the method of example 1, wherein the server certificate comprises an extension that includes a server privacy policy.

There is further disclosed in example 8, the method of example 1, wherein the enrollment server is an enrollment over secure transport (EST) server, and the intermediate device is configured to act as an EST proxy to the endpoint device.

There is further disclosed in example 9, the method of example 1, further comprising deriving an authentication domain name (ADN) from the signed client identity certificate.

There is further disclosed in example 10, the method of example 9, further comprising using the ADN to connect the endpoint device to the DNS server from an untrusted external network.

There is further disclosed in example 11, the method of example 10, further comprising automatically detecting, on the endpoint device, that the endpoint device has connected to the untrusted external network.

There is further disclosed in example 12, an apparatus comprising means for performing the method of any of examples 1-11.

There is further disclosed in example 13, the apparatus of example 12, wherein the means for performing the method comprise a processor and a memory.

There is further disclosed in example 14, the apparatus of example 13, wherein the memory comprises machine-readable instructions that, when executed, cause the apparatus to perform the method of any of examples 1-11.

There is further disclosed in example 15, the apparatus of examples 12-14, wherein the apparatus is a computing system.

There is further disclosed in example 16, at least one computer readable medium comprising instructions that, when executed, implement a method or realize an apparatus as in any of examples 1-15.

There is further disclosed in example 17 one or more tangible, nontransitory computer-readable media having stored thereon instructions to instruct a processor to: provision a signed client identity certificate for an endpoint device, comprising providing, from an intermediate device, an unsigned client identity certificate for the endpoint device to an enrollment server, receiving from the enrollment server the signed client identity certificate, and providing the signed client identity certificate to the endpoint device; receive a server certificate for a DNS server; provide the server certificate to the endpoint device; and establish an encrypted DNS session between the endpoint device and the DNS server using the signed client identity certificate and the server certificate.

There is further disclosed in example 18, the one or more tangible, nontransitory computer-readable media of example 17, wherein the instructions are further to establish a transport layer security (TLS) session between the intermediate device and the endpoint device, and providing the server certificate via the TLS session.

There is further disclosed in example 19, the one or more tangible, nontransitory computer-readable media of example 17, wherein the intermediate device is a home network gateway.

There is further disclosed in example 20, the one or more tangible, nontransitory computer-readable media of example 19, further comprising providing caching DNS services via the home network gateway.

There is further disclosed in example 21, the one or more tangible, nontransitory computer-readable media of example 19, further comprising maintaining a copy of the signed client identity certificate on the home network gateway, whereby the home network gateway can act as an intermediary in the encrypted DNS session.

There is further disclosed in example 22, the one or more tangible, nontransitory computer-readable media of example 17, wherein the instructions are further to provide domain-name based access controls for the encrypted DNS session.

There is further disclosed in example 23, the one or more tangible, nontransitory computer-readable media of example 17, wherein the server certificate comprises an extension that includes a server privacy policy.

There is further disclosed in example 24, the one or more tangible, nontransitory computer-readable media of example 17, wherein the enrollment server is an enrollment over secure transport (EST) server, and the intermediate device is configured to act as an EST proxy to the endpoint device.

There is further disclosed in example 25, the one or more tangible, nontransitory computer-readable media of example 17, wherein the instructions are further to derive an authentication domain name (ADN) from the signed client identity certificate.

There is further disclosed in example 26, the one or more tangible, nontransitory computer-readable media of example 25, wherein the instructions are further to use the ADN to connect the endpoint device to the DNS server from an untrusted external network.

There is further disclosed in example 27, the one or more tangible, nontransitory computer-readable media of example 26, wherein the instructions are further to automatically detect, on the endpoint device, that the endpoint device has connected to the untrusted external network.

There is further disclosed in example 28, an endpoint apparatus, comprising: a processor circuit; a memory; and instructions encoded within the memory to instruct the processor circuit to: establish an encrypted connection with a gateway device; receive a signed client identity certificate from the gateway device, via the encrypted connection, wherein the signed client identity certificate is signed by an enrollment server; receive a server certificate for a domain name system (DNS) server via the encrypted connection; establish an encrypted DNS session with the DNS server using the server certificate and the signed client identity certificate.

There is further disclosed in example 29, the endpoint apparatus of example 28, wherein the instructions are to establish the encrypted DNS session with the gateway device as an intermediate caching DNS server.

There is further disclosed in example 30, the endpoint apparatus of example 28, wherein the encrypted connection comprises a transport layer security (TLS) session.

There is further disclosed in example 31, the endpoint apparatus of example 28, wherein the gateway device is a gateway for a home network of the endpoint apparatus.

There is further disclosed in example 32, the endpoint apparatus of example 28, wherein the server certificate comprises an extension that includes a server privacy policy.

There is further disclosed in example 33, the endpoint apparatus of example 28, wherein the enrollment server is an enrollment over secure transport (EST) server, and the gateway device is configured to act as an EST proxy to the endpoint apparatus.

There is further disclosed in example 34, the endpoint apparatus of example 28, wherein the instructions are further to derive an authentication domain name (ADN) from the signed client identity certificate.

There is further disclosed in example 35, the endpoint apparatus of example 34, wherein the instructions are further to use the ADN to connect the endpoint apparatus to the DNS server from an untrusted external network.

There is further disclosed in example 36, the endpoint apparatus of example 35, wherein the instructions are further to automatically detect that the endpoint apparatus has connected to the untrusted external network, and establish the encrypted DNS session before sending other network traffic.

What is claimed is:

1. A method of provisioning an endpoint device for encrypted domain name service (DNS) resolution, comprising:
   provisioning a signed client identity certificate for the endpoint device, comprising providing, from an intermediate device, an unsigned client identity certificate for the endpoint device to an enrollment server, receiving from the enrollment server the signed client identity certificate, and providing the signed client identity certificate to the endpoint device;
   receiving an internet service provider (ISP) server certificate for an ISP DNS server;
   providing the server certificate to the endpoint device;
   establishing a first encrypted DNS session between the endpoint device and the ISP DNS server using the signed client identity certificate and the server certificate, using DNS over hypertext transport protocol secured (DoH) or DNS over transport layer security (DoT); and
   providing cloud-based DNS security services to the endpoint device, including enabling the endpoint device to use the signed client identity certificate to establish a second encrypted DNS session to the ISP DNS server when the endpoint device roams outside of a home network.

2. The method of claim 1, further comprising establishing a transport layer security (TLS) session between the intermediate device and the endpoint device, and providing the server certificate via the TLS session.

3. The method of claim 1, wherein the intermediate device is a home network gateway.

4. The method of claim 3, further comprising providing caching DNS services via the home network gateway.

5. The method of claim 3, further comprising maintaining a copy of the signed client identity certificate on the home network gateway, whereby the home network gateway can act as an intermediary in the first encrypted DNS session.

6. The method of claim 1, further comprising providing domain-name based access controls for the first encrypted DNS session.

7. The method of claim 1, wherein the server certificate comprises an extension that includes a server privacy policy.

8. The method of claim 1, wherein the enrollment server is an enrollment over secure transport (EST) server, and the intermediate device is configured to act as an EST proxy to the endpoint device.

9. The method of claim 1, further comprising deriving an authentication domain name (ADN) from the signed client identity certificate.

10. The method of claim 9, further comprising using the ADN to connect the endpoint device to the ISP DNS server from an untrusted external network.

11. The method of claim 10, further comprising automatically detecting, on the endpoint device, that the endpoint device has connected to the untrusted external network.

12. One or more tangible, nontransitory computer-readable media having stored thereon instructions to instruct a processor to:
   provision a signed client identity certificate for an endpoint device, comprising providing, from an intermediate device, an unsigned client identity certificate for the endpoint device to an enrollment server, receiving from the enrollment server the signed client identity certificate, and providing the signed client identity certificate to the endpoint device;
   receive an internet service provider (ISP) server certificate for an ISP DNS server;
   provide the server certificate to the endpoint device;
   establish an a first encrypted DNS session between the endpoint device and the ISP DNS server using the signed client identity certificate and the server certificate, using DNS over hypertext transport protocol secured (DoH) or DNS over transport layer security (DoT); and
   provide cloud-based DNS security services to the endpoint device, including enabling the endpoint device to use the signed client identity certificate to establish a second encrypted DNS session to the ISP DNS server when the endpoint device roams outside of a home network.

13. The one or more tangible, nontransitory computer-readable media of claim 12, wherein the intermediate device is a home network gateway.

14. The one or more tangible, nontransitory computer-readable media of claim 13, further comprising providing caching DNS services via the home network gateway.

15. An endpoint apparatus, comprising:
a processor circuit;
a memory; and
instructions encoded within the memory to instruct the processor circuit to:
- establish an encrypted connection with a gateway device;
- receive a signed client identity certificate from the gateway device, via the encrypted connection, wherein the signed client identity certificate is signed by an enrollment server;
- receive an internet service provider (ISP) server certificate for an ISP domain name system (DNS) server via the encrypted connection;
- establish an encrypted DNS session with the ISP DNS server with the server certificate and the signed client identity certificate, using DNS over hypertext transport protocol secured (DoH) or DNS over transport layer security (DoT); and
- receive cloud-based DNS security services via the encrypted DNS session, including enabling the endpoint apparatus to use the signed client identity certificate to establish a second encrypted DNS session to the ISP DNS server when the endpoint apparatus roams outside of a home network.

16. The endpoint apparatus of claim 15, wherein the instructions are to establish the encrypted DNS session with the gateway device as an intermediate caching DNS server.

17. The endpoint apparatus of claim 15, wherein the gateway device is a gateway for a home network of the endpoint apparatus.

18. The endpoint apparatus of claim 15, wherein the instructions are further to derive an authentication domain name (ADN) from the signed client identity certificate.

19. The endpoint apparatus of claim 18, wherein the instructions are further to use the ADN to connect the endpoint apparatus to the ISP DNS server from an untrusted external network.

20. The endpoint apparatus of claim 19, wherein the instructions are further to automatically detect that the endpoint apparatus has connected to the untrusted external network, and establish the encrypted DNS session before sending other network traffic.

* * * * *

UNITED STATES PATENT AND TRADEMARK OFFICE
CERTIFICATE OF CORRECTION

| | |
|---|---|
| PATENT NO. | : 11,881,938 B2 |
| APPLICATION NO. | : 17/894898 |
| DATED | : January 23, 2024 |
| INVENTOR(S) | : Konda et al. |

It is certified that error appears in the above-identified patent and that said Letters Patent is hereby corrected as shown below:

In the Drawings

Sheet 6 of 15, in "Fig. 4", for Tag "408", Line 1, delete "ESTAGBLISH" and insert
-- ESTABLISH --, therefor.

Sheet 7 of 15, in "Fig. 5", for Tag "508", Line 2, delete "DOMAN" and insert -- DOMAIN --, therefor.

Signed and Sealed this
Twenty-third Day of April, 2024

Katherine Kelly Vidal
*Director of the United States Patent and Trademark Office*